United States Patent
Boroujerdi et al.

(10) Patent No.: US 12,387,444 B2
(45) Date of Patent: *Aug. 12, 2025

(54) INTEGRATING AUGMENTED REALITY EXPERIENCES WITH OTHER COMPONENTS

(71) Applicant: Snap Inc., Santa Monica, CA (US)

(72) Inventors: Rastan Boroujerdi, Hermosa Beach, CA (US); Michael John Evans, Auckland (NZ); Panayoti Haritatos, Rocklin, CA (US)

(73) Assignee: Snap Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/665,388

(22) Filed: May 15, 2024

(65) Prior Publication Data

US 2024/0303945 A1    Sep. 12, 2024

Related U.S. Application Data

(63) Continuation of application No. 17/845,496, filed on Jun. 21, 2022, now Pat. No. 12,020,384.

(51) Int. Cl.
| | |
|---|---|
| *G06F 3/04815* | (2022.01) |
| *G01C 21/36* | (2006.01) |

(Continued)

(52) U.S. Cl.
CPC ........ *G06T 19/006* (2013.01); *G01C 21/3647* (2013.01); *G06F 3/04815* (2013.01);
(Continued)

(58) Field of Classification Search
CPC ............... G06T 19/006; G06T 2200/24; G06T 2219/024; G01C 21/3647; G06F 3/04815; G06F 3/04842; H04L 63/083
(Continued)

(56) References Cited

U.S. PATENT DOCUMENTS

| 666,223 A | 1/1901 | Shedlock |
|---|---|---|
| 4,581,634 A | 4/1986 | Williams |
| (Continued) | | |

FOREIGN PATENT DOCUMENTS

| CA | 2887596 A1 | 7/2015 |
|---|---|---|
| CN | 109863532 A | 6/2019 |
| (Continued) | | |

OTHER PUBLICATIONS

"A Whole New Story", Snap, Inc., [Online] Retrieved from the Internet: <URL: https://www.snap.com/en-US/news/>, (2017), 13 pgs.

(Continued)

*Primary Examiner* — Jin Ge
(74) *Attorney, Agent, or Firm* — Schwegman Lundberg & Woessner, P.A.

(57) ABSTRACT

Methods and systems are disclosed for generating AR experiences. The methods and systems access a first component of a plurality of components implemented by the messaging application, the plurality of components comprising an AR experience, each of the plurality of components being configured to be separately launched by the messaging application. The methods and systems store a first state of the first component in a data structure that is shared across the plurality of components; launching. The methods and system launch, by the messaging application, a second component of the plurality of components in response to determining that an interaction has been performed using the first component; and configure a second state of the second component based on the interaction that has been performed using the first component.

20 Claims, 12 Drawing Sheets

(51) Int. Cl.
  *G06F 3/04842* (2022.01)
  *G06T 19/00* (2011.01)
  *H04L 9/40* (2022.01)

(52) U.S. Cl.
  CPC ........ *G06F 3/04842* (2013.01); *H04L 63/083* (2013.01); *G06T 2200/24* (2013.01); *G06T 2219/024* (2013.01)

(58) Field of Classification Search
  USPC ........................................................ 345/633
  See application file for complete search history.

(56) References Cited

U.S. PATENT DOCUMENTS

| | | | |
|---|---|---|---|
| 4,975,690 | A | 12/1990 | Torres |
| 5,072,412 | A | 12/1991 | Henderson, Jr. et al. |
| 5,493,692 | A | 2/1996 | Theimer et al. |
| 5,604,843 | A | 2/1997 | Shaw et al. |
| 5,689,559 | A | 11/1997 | Park |
| 5,713,073 | A | 1/1998 | Warsta |
| 5,754,939 | A | 5/1998 | Herz et al. |
| 5,855,008 | A | 12/1998 | Goldhaber et al. |
| 5,880,731 | A | 3/1999 | Liles et al. |
| 5,883,639 | A | 3/1999 | Walton et al. |
| 5,999,932 | A | 12/1999 | Paul |
| 6,012,098 | A | 1/2000 | Bayeh et al. |
| 6,014,090 | A | 1/2000 | Rosen et al. |
| 6,023,270 | A | 2/2000 | Brush, II et al. |
| 6,029,141 | A | 2/2000 | Bezos et al. |
| 6,038,295 | A | 3/2000 | Mattes |
| 6,049,711 | A | 4/2000 | Yehezkel et al. |
| RE36,919 | E | 10/2000 | Park |
| 6,154,764 | A | 11/2000 | Nitta et al. |
| 6,167,435 | A | 12/2000 | Druckenmiller et al. |
| RE37,052 | E | 2/2001 | Park |
| 6,204,840 | B1 | 3/2001 | Petelycky et al. |
| 6,205,432 | B1 | 3/2001 | Gabbard et al. |
| 6,216,141 | B1 | 4/2001 | Straub et al. |
| 6,223,165 | B1 | 4/2001 | Lauffer |
| 6,285,381 | B1 | 9/2001 | Sawano et al. |
| 6,285,987 | B1 | 9/2001 | Roth et al. |
| 6,310,694 | B1 | 10/2001 | Okimoto et al. |
| 6,317,789 | B1 | 11/2001 | Rakavy et al. |
| 6,334,149 | B1 | 12/2001 | Davis, Jr. et al. |
| 6,349,203 | B1 | 2/2002 | Asaoka et al. |
| 6,353,170 | B1 | 3/2002 | Eyzaguirre et al. |
| 6,446,004 | B1 | 9/2002 | Cao et al. |
| 6,449,657 | B2 | 9/2002 | Stanbach et al. |
| 6,456,852 | B2 | 9/2002 | Bar et al. |
| 6,484,196 | B1 | 11/2002 | Maurille |
| 6,487,601 | B1 | 11/2002 | Hubacher et al. |
| 6,523,008 | B1 | 2/2003 | Avrunin |
| 6,542,749 | B2 | 4/2003 | Tanaka et al. |
| 6,549,768 | B1 | 4/2003 | Fraccaroli |
| 6,618,593 | B1 | 9/2003 | Drutman et al. |
| 6,622,174 | B1 | 9/2003 | Ukita et al. |
| 6,631,463 | B1 | 10/2003 | Floyd et al. |
| 6,636,247 | B1 | 10/2003 | Hamzy et al. |
| 6,636,855 | B2 | 10/2003 | Holloway et al. |
| 6,643,684 | B1 | 11/2003 | Malkin et al. |
| 6,650,793 | B1 | 11/2003 | Lund et al. |
| 6,658,095 | B1 | 12/2003 | Yoakum et al. |
| 6,665,531 | B1 | 12/2003 | Soderbacka et al. |
| 6,668,173 | B2 | 12/2003 | Greene |
| 6,684,238 | B1 | 1/2004 | Dutta |
| 6,684,257 | B1 | 1/2004 | Camut et al. |
| 6,698,020 | B1 | 2/2004 | Zigmond et al. |
| 6,700,506 | B1 | 3/2004 | Winkler |
| 6,720,860 | B1 | 4/2004 | Narayanaswami |
| 6,724,403 | B1 | 4/2004 | Santoro et al. |
| 6,757,713 | B1 | 6/2004 | Ogilvie et al. |
| 6,772,195 | B1 | 8/2004 | Hatlelid et al. |
| 6,804,417 | B1 | 10/2004 | Lund et al. |
| 6,832,222 | B1 | 12/2004 | Zimowski |
| 6,834,195 | B2 | 12/2004 | Brandenberg et al. |
| 6,836,792 | B1 | 12/2004 | Chen |
| 6,842,779 | B1 | 1/2005 | Nishizawa |
| 6,898,626 | B2 | 5/2005 | Ohashi |
| 6,959,324 | B1 | 10/2005 | Kubik et al. |
| 6,970,088 | B2 | 11/2005 | Kovach |
| 6,970,907 | B1 | 11/2005 | Ullmann et al. |
| 6,980,909 | B2 | 12/2005 | Root et al. |
| 6,981,040 | B1 | 12/2005 | Konig et al. |
| 7,020,494 | B2 | 3/2006 | Spriestersbach et al. |
| 7,027,124 | B2 | 4/2006 | Foote et al. |
| 7,072,963 | B2 | 7/2006 | Anderson et al. |
| 7,085,571 | B2 | 8/2006 | Kalhan et al. |
| 7,110,744 | B2 | 9/2006 | Freeny, Jr. |
| 7,124,164 | B1 | 10/2006 | Chemtob |
| 7,149,893 | B1 | 12/2006 | Leonard et al. |
| 7,173,651 | B1 | 2/2007 | Knowles |
| 7,188,143 | B2 | 3/2007 | Szeto |
| 7,203,380 | B2 | 4/2007 | Chiu et al. |
| 7,206,568 | B2 | 4/2007 | Sudit |
| 7,227,937 | B2 | 6/2007 | Yoakum et al. |
| 7,237,002 | B1 | 6/2007 | Estrada et al. |
| 7,240,089 | B2 | 7/2007 | Boudreau |
| 7,269,426 | B2 | 9/2007 | Kokkonen et al. |
| 7,280,658 | B2 | 10/2007 | Amini et al. |
| 7,315,823 | B2 | 1/2008 | Brondrup |
| 7,342,587 | B2 | 3/2008 | Danzig et al. |
| 7,349,768 | B2 | 3/2008 | Bruce et al. |
| 7,356,564 | B2 | 4/2008 | Hartselle et al. |
| 7,394,345 | B1 | 7/2008 | Ehlinger et al. |
| 7,411,493 | B2 | 8/2008 | Smith |
| 7,423,580 | B2 | 9/2008 | Markhovsky et al. |
| 7,454,442 | B2 | 11/2008 | Cobleigh et al. |
| 7,468,729 | B1 | 12/2008 | Levinson |
| 7,508,419 | B2 | 3/2009 | Toyama et al. |
| 7,519,670 | B2 | 4/2009 | Hagale et al. |
| 7,535,890 | B2 | 5/2009 | Rojas |
| 7,546,554 | B2 | 6/2009 | Chiu et al. |
| 7,607,096 | B2 | 10/2009 | Oreizy et al. |
| 7,636,755 | B2 | 12/2009 | Blattner et al. |
| 7,639,251 | B2 | 12/2009 | Gu et al. |
| 7,639,943 | B1 | 12/2009 | Kalajan |
| 7,650,231 | B2 | 1/2010 | Gadler |
| 7,668,537 | B2 | 2/2010 | DeVries |
| 7,770,137 | B2 | 8/2010 | Forbes et al. |
| 7,775,885 | B2 | 8/2010 | Van et al. |
| 7,778,973 | B2 | 8/2010 | Choi |
| 7,779,444 | B2 | 8/2010 | Glad |
| 7,787,886 | B2 | 8/2010 | Markhovsky et al. |
| 7,796,946 | B2 | 9/2010 | Eisenbach |
| 7,801,954 | B2 | 9/2010 | Cadiz et al. |
| 7,856,360 | B2 | 12/2010 | Kramer et al. |
| 7,859,551 | B2 | 12/2010 | Bulman et al. |
| 7,885,931 | B2 | 2/2011 | Seo et al. |
| 7,925,703 | B2 | 4/2011 | Dinan et al. |
| 8,001,204 | B2 | 8/2011 | Burtner et al. |
| 8,032,586 | B2 | 10/2011 | Challenger et al. |
| 8,082,255 | B1 | 12/2011 | Carlson, Jr. et al. |
| 8,088,044 | B2 | 1/2012 | Tchao et al. |
| 8,090,351 | B2 | 1/2012 | Klein |
| 8,095,878 | B2 | 1/2012 | Bates et al. |
| 8,098,904 | B2 | 1/2012 | Ioffe et al. |
| 8,099,109 | B2 | 1/2012 | Altman et al. |
| 8,108,774 | B2 | 1/2012 | Finn et al. |
| 8,112,716 | B2 | 2/2012 | Kobayashi |
| 8,117,281 | B2 | 2/2012 | Robinson et al. |
| 8,130,219 | B2 | 3/2012 | Fleury et al. |
| 8,131,597 | B2 | 3/2012 | Hudetz |
| 8,135,166 | B2 | 3/2012 | Rhoads |
| 8,136,028 | B1 | 3/2012 | Loeb et al. |
| 8,146,001 | B1 | 3/2012 | Reese |
| 8,146,005 | B2 | 3/2012 | Jones et al. |
| 8,151,191 | B2 | 4/2012 | Nicol |
| 8,161,115 | B2 | 4/2012 | Yamamoto |
| 8,161,417 | B1 | 4/2012 | Lee |
| 8,195,203 | B1 | 6/2012 | Tseng |
| 8,199,747 | B2 | 6/2012 | Rojas et al. |
| 8,208,943 | B2 | 6/2012 | Petersen |
| 8,214,443 | B2 | 7/2012 | Hamburg |

(56) References Cited

U.S. PATENT DOCUMENTS

| | | |
|---|---|---|
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| RE43,993 E | 2/2013 | Park |
| 8,379,130 B2 | 2/2013 | Forutanpour et al. |
| 8,384,719 B2 | 2/2013 | Reville et al. |
| 8,385,950 B1 | 2/2013 | Wagner et al. |
| RE44,054 E | 3/2013 | Kim |
| RE44,068 E | 3/2013 | Park |
| RE44,106 E | 3/2013 | Park |
| 8,396,708 B2 | 3/2013 | Park et al. |
| 8,402,097 B2 | 3/2013 | Szeto |
| 8,405,773 B2 | 3/2013 | Hayashi et al. |
| RE44,121 E | 4/2013 | Park |
| 8,418,067 B2 | 4/2013 | Cheng et al. |
| 8,423,409 B2 | 4/2013 | Rao |
| 8,425,322 B2 | 4/2013 | Gillo et al. |
| 8,458,601 B2 | 6/2013 | Castelli et al. |
| 8,462,198 B2 | 6/2013 | Lin et al. |
| 8,471,914 B2 | 6/2013 | Sakiyama et al. |
| 8,472,935 B1 | 6/2013 | Fujisaki |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,559,980 B2 | 10/2013 | Pujol |
| 8,560,612 B2 | 10/2013 | Kilmer et al. |
| 8,564,621 B2 | 10/2013 | Branson et al. |
| 8,564,710 B2 | 10/2013 | Nonaka et al. |
| 8,581,911 B2 | 11/2013 | Becker et al. |
| 8,594,680 B2 | 11/2013 | Ledlie et al. |
| 8,597,121 B2 | 12/2013 | del Valle |
| 8,601,051 B2 | 12/2013 | Wang |
| 8,601,379 B2 | 12/2013 | Marks et al. |
| 8,613,089 B1 | 12/2013 | Holloway et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,683,354 B2 | 3/2014 | Khandelwal et al. |
| 8,692,830 B2 | 4/2014 | Nelson et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,890,926 B2 | 11/2014 | Tandon et al. |
| 8,892,999 B2 | 11/2014 | Nims et al. |
| 8,909,679 B2 | 12/2014 | Root et al. |
| 8,909,725 B1 | 12/2014 | Sehn |
| 8,924,250 B2 | 12/2014 | Bates et al. |
| 8,963,926 B2 | 2/2015 | Brown et al. |
| 8,972,357 B2 | 3/2015 | Shim et al. |
| 8,989,786 B2 | 3/2015 | Feghali |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,086,776 B2 | 7/2015 | Ye et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,105,014 B2 | 8/2015 | Collet et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,241,184 B2 | 1/2016 | Weerasinghe |
| 9,256,860 B2 | 2/2016 | Herger et al. |
| 9,258,459 B2 | 2/2016 | Hartley |
| 9,298,257 B2 | 3/2016 | Hwang et al. |
| 9,314,692 B2 | 4/2016 | Konoplev et al. |
| 9,330,483 B2 | 5/2016 | Du et al. |
| 9,344,606 B2 | 5/2016 | Hartley et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,385,983 B1 | 7/2016 | Sehn |
| 9,396,354 B1 | 7/2016 | Murphy et al. |
| 9,402,057 B2 | 7/2016 | Kaytaz et al. |
| 9,407,712 B1 | 8/2016 | Sehn |
| 9,407,816 B1 | 8/2016 | Sehn |
| 9,412,192 B2 | 8/2016 | Mandel et al. |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,460,541 B2 | 10/2016 | Li et al. |
| 9,489,661 B2 | 11/2016 | Evans et al. |
| 9,489,760 B2 | 11/2016 | Li et al. |
| 9,491,134 B2 | 11/2016 | Rosen et al. |
| 9,503,845 B2 | 11/2016 | Vincent |
| 9,508,197 B2 | 11/2016 | Quinn et al. |
| 9,532,171 B2 | 12/2016 | Allen et al. |
| 9,532,364 B2 | 12/2016 | Fujito |
| 9,537,811 B2 | 1/2017 | Allen et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,628,950 B1 | 4/2017 | Noeth et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,710,821 B2 | 7/2017 | Heath |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,854,219 B2 | 12/2017 | Sehn |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |

(56) References Cited

U.S. PATENT DOCUMENTS

| | | |
|---|---|---|
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,158,589 B2 | 12/2018 | Collet et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,348,662 B2 | 7/2019 | Baldwin et al. |
| 10,362,219 B2 | 7/2019 | Wilson et al. |
| 10,432,559 B2 | 10/2019 | Baldwin et al. |
| 10,454,857 B1 | 10/2019 | Blackstock et al. |
| 10,475,225 B2 | 11/2019 | Park et al. |
| 10,504,266 B2 | 12/2019 | Blattner et al. |
| 10,554,596 B1 | 2/2020 | Fish et al. |
| 10,573,048 B2 | 2/2020 | Ni et al. |
| 10,656,797 B1 | 5/2020 | Alvi et al. |
| 10,657,695 B2 | 5/2020 | Chand et al. |
| 10,657,701 B2 | 5/2020 | Osman et al. |
| 10,674,311 B1 | 6/2020 | Bouba et al. |
| 10,762,174 B2 | 9/2020 | Denton et al. |
| 10,805,248 B2 | 10/2020 | Luo et al. |
| 10,872,451 B2 | 12/2020 | Sheth et al. |
| 10,880,246 B2 | 12/2020 | Baldwin et al. |
| 10,893,385 B1 | 1/2021 | Berardino et al. |
| 10,895,964 B1 | 1/2021 | Grantham et al. |
| 10,896,534 B1 | 1/2021 | Smith et al. |
| 10,933,311 B2 | 3/2021 | Brody et al. |
| 10,936,066 B1 | 3/2021 | Jaureguiberry et al. |
| 10,938,758 B2 | 3/2021 | Allen et al. |
| 10,939,246 B1 | 3/2021 | Dancie et al. |
| 10,945,098 B2 | 3/2021 | Dancie et al. |
| 10,964,082 B2 | 3/2021 | Amitay et al. |
| 10,979,752 B1 | 4/2021 | Brody et al. |
| 10,984,575 B2 | 4/2021 | Assouline et al. |
| 10,992,619 B2 | 4/2021 | Antmen et al. |
| 11,010,022 B2 | 5/2021 | Alvi et al. |
| 11,030,789 B2 | 6/2021 | Chand et al. |
| 11,032,670 B1 | 6/2021 | Baylin et al. |
| 11,036,781 B1 | 6/2021 | Baril et al. |
| 11,039,270 B2 | 6/2021 | Bouba et al. |
| 11,063,891 B2 | 7/2021 | Voss |
| 11,069,103 B1 | 7/2021 | Blackstock et al. |
| 11,080,917 B2 | 8/2021 | Monroy-hernández et al. |
| 11,128,586 B2 | 9/2021 | Al Majid et al. |
| 11,166,123 B1 | 11/2021 | Guillaume |
| 11,188,190 B2 | 11/2021 | Blackstock et al. |
| 11,189,070 B2 | 11/2021 | Jahangiri et al. |
| 11,199,957 B1 | 12/2021 | Alvi et al. |
| 11,218,433 B2 | 1/2022 | Baldwin et al. |
| 11,229,849 B2 | 1/2022 | Blackstock et al. |
| 11,245,658 B2 | 2/2022 | Grantham et al. |
| 11,249,614 B2 | 2/2022 | Brody |
| 11,263,254 B2 | 3/2022 | Baril et al. |
| 11,270,491 B2 | 3/2022 | Monroy-Hernández et al. |
| 11,275,439 B2 | 3/2022 | Jaureguiberry et al. |
| 11,284,144 B2 | 3/2022 | Kotsopoulos et al. |
| 11,294,936 B1 | 4/2022 | Jaureguiberry |
| 11,307,747 B2 | 4/2022 | Dancie et al. |
| 2002/0047868 A1 | 4/2002 | Miyazawa |
| 2002/0067362 A1 | 6/2002 | Agostino Nocera et al. |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2002/0169644 A1 | 11/2002 | Greene |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0162419 A1 | 7/2005 | Kim et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0206610 A1 | 9/2005 | Cordelli |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2006/0294465 A1 | 12/2006 | Ronen et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0113181 A1 | 5/2007 | Blattner et al. |
| 2007/0136228 A1 | 6/2007 | Petersen |
| 2007/0168863 A1 | 7/2007 | Blattner et al. |
| 2007/0176921 A1 | 8/2007 | Iwasaki et al. |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |
| 2008/0062141 A1 | 3/2008 | Chandhri |
| 2008/0076505 A1 | 3/2008 | Ngyen et al. |

(56) References Cited

U.S. PATENT DOCUMENTS

| | | |
|---|---|---|
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158222 A1 | 7/2008 | Li et al. |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0016617 A1 | 1/2009 | Bregman-amitai et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0055484 A1 | 2/2009 | Vuong et al. |
| 2009/0058822 A1 | 3/2009 | Chaudhri |
| 2009/0070688 A1 | 3/2009 | Gyorfi et al. |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0099925 A1 | 4/2009 | Mehta et al. |
| 2009/0106672 A1 | 4/2009 | Burstrom |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0158170 A1 | 6/2009 | Narayanan et al. |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0177976 A1 | 7/2009 | Bokor et al. |
| 2009/0192900 A1 | 7/2009 | Collision |
| 2009/0199242 A1 | 8/2009 | Johnson et al. |
| 2009/0202114 A1 | 8/2009 | Morin et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265604 A1 | 10/2009 | Howard et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0300525 A1 | 12/2009 | Jolliff et al. |
| 2009/0303984 A1 | 12/2009 | Clark et al. |
| 2009/0319607 A1 | 12/2009 | Belz et al. |
| 2009/0327073 A1 | 12/2009 | Li |
| 2010/0011422 A1 | 1/2010 | Mason et al. |
| 2010/0023885 A1 | 1/2010 | Reville et al. |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0115426 A1 | 5/2010 | Liu et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0203968 A1 | 8/2010 | Gill et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0227682 A1 | 9/2010 | Reville et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0093780 A1 | 4/2011 | Dunn |
| 2011/0102630 A1 | 5/2011 | Rukes |
| 2011/0115798 A1 | 5/2011 | Nayar et al. |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0148864 A1 | 6/2011 | Lee et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0239136 A1 | 9/2011 | Goldman et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |

(56) References Cited

U.S. PATENT DOCUMENTS

| | | |
|---|---|---|
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113106 A1 | 5/2012 | Choi et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0130717 A1 | 5/2012 | Xu et al. |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0103760 A1 | 4/2013 | Golding et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0201187 A1 | 8/2013 | Tong et al. |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0249948 A1 | 9/2013 | Reitan |
| 2013/0257877 A1 | 10/2013 | Davis |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0043329 A1 | 2/2014 | Wang et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0055554 A1 | 2/2014 | Du et al. |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0125678 A1 | 5/2014 | Wang et al. |
| 2014/0129343 A1 | 5/2014 | Finster et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |

(56) References Cited

U.S. PATENT DOCUMENTS

| | | |
|---|---|---|
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0206349 A1 | 7/2015 | Rosenthal et al. |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0134840 A1 | 5/2016 | Mcculloch |
| 2016/0180887 A1 | 6/2016 | Sehn |
| 2016/0182422 A1 | 6/2016 | Sehn et al. |
| 2016/0182875 A1 | 6/2016 | Sehn |
| 2016/0234149 A1 | 8/2016 | Tsuda et al. |
| 2016/0239248 A1 | 8/2016 | Sehn |
| 2016/0277419 A1 | 9/2016 | Allen et al. |
| 2016/0321708 A1 | 11/2016 | Sehn |
| 2017/0006094 A1 | 1/2017 | Abou Mahmoud et al. |
| 2017/0061308 A1 | 3/2017 | Chen et al. |
| 2017/0080346 A1 | 3/2017 | Abbas |
| 2017/0087473 A1 | 3/2017 | Siegel et al. |
| 2017/0113140 A1 | 4/2017 | Blackstock et al. |
| 2017/0118145 A1 | 4/2017 | Aittoniemi et al. |
| 2017/0199855 A1 | 7/2017 | Fishbeck |
| 2017/0235848 A1 | 8/2017 | Van Deusen et al. |
| 2017/0287006 A1 | 10/2017 | Azmoodeh et al. |
| 2017/0310934 A1 | 10/2017 | Du et al. |
| 2017/0312634 A1 | 11/2017 | Ledoux et al. |
| 2018/0047200 A1 | 2/2018 | O'hara et al. |
| 2018/0113587 A1 | 4/2018 | Allen et al. |
| 2018/0115503 A1 | 4/2018 | Baldwin et al. |
| 2018/0198743 A1 | 7/2018 | Blackstock et al. |
| 2018/0315076 A1 | 11/2018 | Andreou |
| 2018/0315133 A1 | 11/2018 | Brody et al. |
| 2018/0315134 A1 | 11/2018 | Amitay et al. |
| 2019/0001223 A1 | 1/2019 | Blackstock et al. |
| 2019/0030436 A1* | 1/2019 | Miyamoto ............. A63F 13/67 |
| 2019/0057616 A1 | 2/2019 | Cohen et al. |
| 2019/0097958 A1 | 3/2019 | Collet et al. |
| 2019/0114061 A1* | 4/2019 | Daniels ................. G06F 3/048 |
| 2019/0179405 A1* | 6/2019 | Sun ....................... G06F 1/1686 |
| 2019/0188920 A1 | 6/2019 | Mcphee et al. |
| 2019/0280997 A1 | 9/2019 | Baldwin et al. |
| 2020/0306637 A1 | 10/2020 | Baldwin et al. |
| 2020/0309037 A1* | 10/2020 | Bortoli ..................... F02K 3/06 |
| 2020/0314046 A1 | 10/2020 | Jung |
| 2020/0314586 A1 | 10/2020 | Bouba et al. |
| 2020/0372127 A1 | 11/2020 | Denton et al. |
| 2020/0382912 A1 | 12/2020 | Dancie et al. |
| 2020/0401225 A1 | 12/2020 | Jaureguiberry et al. |
| 2020/0410575 A1 | 12/2020 | Grantham et al. |
| 2021/0011612 A1 | 1/2021 | Dancie et al. |
| 2021/0074047 A1 | 3/2021 | Sheth et al. |
| 2021/0089179 A1 | 3/2021 | Grantham et al. |
| 2021/0104087 A1 | 4/2021 | Smith et al. |
| 2021/0152979 A1 | 5/2021 | Berardino et al. |
| 2021/0168108 A1 | 6/2021 | Antmen et al. |
| 2021/0170270 A1 | 6/2021 | Brody et al. |
| 2021/0192823 A1 | 6/2021 | Amitay et al. |
| 2021/0209825 A1 | 7/2021 | Assouline et al. |
| 2021/0225058 A1 | 7/2021 | Chand et al. |
| 2021/0240315 A1 | 8/2021 | Alvi et al. |
| 2021/0243482 A1 | 8/2021 | Baril et al. |
| 2021/0243503 A1 | 8/2021 | Kotsopoulos et al. |
| 2021/0266277 A1 | 8/2021 | Allen et al. |
| 2021/0266704 A1 | 8/2021 | Dancie et al. |
| 2021/0281897 A1 | 9/2021 | Brody et al. |
| 2021/0285774 A1 | 9/2021 | Collins et al. |
| 2021/0306290 A1 | 9/2021 | Voss |
| 2021/0306451 A1 | 9/2021 | Heikkinen et al. |
| 2021/0377693 A1 | 12/2021 | Bouba et al. |
| 2021/0385180 A1* | 12/2021 | Al Majid ............. G06F 40/169 |
| 2021/0405831 A1 | 12/2021 | Mourkogiannis et al. |
| 2021/0409535 A1 | 12/2021 | Mourkogiannis et al. |
| 2021/0409610 A1* | 12/2021 | Mandia .................. H04N 5/272 |
| 2021/0409904 A1 | 12/2021 | Baylin et al. |
| 2022/0012929 A1 | 1/2022 | Blackstock et al. |
| 2022/0084295 A1 | 3/2022 | Smith et al. |
| 2022/0103969 A1* | 3/2022 | Drummond ........... H04L 67/125 |
| 2022/0130119 A1* | 4/2022 | Charlton ............... H04L 51/046 |
| 2022/0174455 A1 | 6/2022 | Guillaume |
| 2022/0269345 A1 | 8/2022 | Jaureguiberry et al. |
| 2022/0309037 A1 | 9/2022 | Gutierrez et al. |
| 2023/0410440 A1 | 12/2023 | Boroujerdi et al. |

FOREIGN PATENT DOCUMENTS

| | | |
|---|---|---|
| CN | 110168478 A | 8/2019 |
| EP | 2051480 A1 | 4/2009 |
| EP | 2151797 A1 | 2/2010 |
| EP | 2184092 A2 | 5/2010 |
| GB | 2399928 A | 9/2004 |
| JP | 2001230801 A | 8/2001 |
| JP | 5497931 B2 | 3/2014 |
| KR | 19990073076 A | 10/1999 |
| KR | 20010078417 A | 8/2001 |
| KR | 101445263 B1 | 9/2014 |
| WO | WO-1996024213 A1 | 8/1996 |
| WO | WO-1999063453 A1 | 12/1999 |
| WO | WO-2000058882 A1 | 10/2000 |
| WO | WO-2001029642 A1 | 4/2001 |
| WO | WO-2001050703 A3 | 7/2001 |
| WO | WO-2003094072 A1 | 11/2003 |
| WO | WO-2004095308 A1 | 11/2004 |
| WO | WO-2006107182 A1 | 10/2006 |
| WO | WO-2006118755 A2 | 11/2006 |
| WO | WO-2007092668 A2 | 8/2007 |
| WO | WO-2007134402 A1 | 11/2007 |
| WO | WO-2009043020 A2 | 4/2009 |
| WO | WO-2011040821 A1 | 4/2011 |
| WO | WO-2011119407 A1 | 9/2011 |
| WO | WO-2012139276 A1 | 10/2012 |
| WO | WO-2013008238 A1 | 1/2013 |
| WO | WO-2013027893 A1 | 2/2013 |
| WO | WO-2013045753 A1 | 4/2013 |
| WO | WO-2013152454 A1 | 10/2013 |
| WO | WO-2013166588 A1 | 11/2013 |
| WO | WO-2014006129 A1 | 1/2014 |
| WO | WO-2014031899 A1 | 2/2014 |
| WO | WO-2014068573 A1 | 5/2014 |
| WO | WO-2014115136 A1 | 7/2014 |
| WO | WO-2014194262 A2 | 12/2014 |
| WO | WO-2014194439 A1 | 12/2014 |
| WO | WO-2015192026 A1 | 12/2015 |
| WO | WO-2016044424 A1 | 3/2016 |
| WO | WO-2016054562 A1 | 4/2016 |
| WO | WO-2016065131 A1 | 4/2016 |
| WO | WO-2016090605 A1 | 6/2016 |
| WO | WO-2016100318 A2 | 6/2016 |
| WO | WO-2016100318 A3 | 6/2016 |
| WO | WO-2016100342 A1 | 6/2016 |
| WO | WO-2016149594 A1 | 9/2016 |
| WO | WO-2016179166 A1 | 11/2016 |
| WO | WO-2018081013 A1 | 5/2018 |
| WO | WO-2018102562 A1 | 6/2018 |
| WO | WO-2018129531 A1 | 7/2018 |

(56) References Cited

FOREIGN PATENT DOCUMENTS

| WO | WO-2019089613 A1 | 5/2019 |
|---|---|---|
| WO | WO-2023249984 A1 | 12/2023 |

OTHER PUBLICATIONS

"Adding photos to your listing", eBay, [Online] Retrieved from the Internet: <URL: http://pages.ebay.com/help/sell/pictures.html>, (accessed May 24, 2017), 4 pgs.
"U.S. Appl. No. 17/845,496, Non Final Office Action mailed Jan. 8, 2024", 31 pgs.
"U.S. Appl. No. 17/845,496, Notice of Allowance mailed Feb. 15, 2024", 8 pgs.
"U.S. Appl. No. 17/845,496, Response filed Feb. 1, 2024 to Non Final Office Action mailed Jan. 8, 2024", 12 pgs.
"Bitmoji", Snapchat Support, [Online] Retrieved from the Internet: <URL: https://web.archive.org/web/20190503063620/https://support.snapchat.com/en-US/a/bitmoji>, (captured May 3, 2019), 2 pgs.
"Bitmoji Chrome Extension", [Online] Retrieved from the Internet: <URL: https://web.archive.org/web/20200919024925/https://support.bimoji.com/hc/en-us/articles/360001494066>, (Sep. 19, 2020), 5 pgs.
"Bitmoji Customize text", [Online] Retrieved from the Internet: <URL: https://web.archive.org/web/20210225200456/https://support.bitmoji.com/hc/en-us/articles/360034632291-Customize-Text-on-Bitmoji-Stickers>, (captured Feb. 25, 2021), 3 pgs.
"Bitmoji Family", Snapchat Support, [Online] Retrieved from the Internet: <URL: https://web.archive.org/web/20190503063620/https://support.snapchat.com/en-US/article/bitmoji-family>, (captured May 3, 2019), 4 pgs.
"BlogStomp", StompSoftware, [Online] Retrieved from the Internet: <URL: http://stompsoftware.com/blogstomp>, (accessed May 24, 2017), 12 pgs.
"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.
"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.
"Instant Comics Starring You & Your Friends", Bitstrips Inc, [Online] Retrieved from the Internet: <URL: https://web.archive.org/web/20150206000940/http://company.bitstrips.com/bitstrips-app.html>, (captured Feb. 6, 2015), 3 pgs.
"InstaPlace Photo App Tell The Whole Story", [Online] Retrieved from the Internet: <URL: youtu.be/uF_gFkg1hBM>, (Nov. 8, 2013), 113 pgs., 1:02 min.
"International Application Serial No. PCT/US2015/037251, International Search Report mailed Sep. 29, 2015", 2 pgs.
"International Application Serial No. PCT/US2023/025818, International Search Report mailed Sep. 28, 2023", 4 pgs.
"International Application Serial No. PCT/US2023/025818, Written Opinion mailed Sep. 28, 2023", 4 pgs.
"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.
"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.
"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.
"Manage Your Bitmoji", Snapchat Support, [Online] Retrieved from the Internet: <URL: https://web.archive.org/web/20190503063620/https://support.snapchat.com/en-US/a/manage-bitmoji>, (captured May 3, 2019), 3 pgs.
"Starbucks Cup Magic", [Online] Retrieved from the Internet: <URL: https://www.youtube.com/watch?v=RWwQXi9RGOw>, (Nov. 8, 2011), 87 pgs.; 00:47 min.
"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.
"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.
"Your Own Personal Emoji", Bitstrips Inc, [Online] Retrieved from the Internet: <URL: https://web.archive.org/web/20150205232004/http://bitmoji.com/>, (captured Feb. 5, 2015), 3 pgs.
Carnahan, Daniel, "Snap is Offering Personalized Video Content Through Bitmoji TV", Business Insider, [Online] Retrieved from the Internet: <URL: https://www.businessinsider.com/snap-offers-personalized-video-content-through-bitmoji-tv-2019-12>, (2019), 10 pgs.
Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.
Constine, Josh, "Snapchat launches Bitmoji merch and comic strips starring your avatar", TechCrunch, [Online] Retrieved from the Internet: <URL: https://techcrunch.com/2018/11/13/bitmoji-store/>, (Nov. 13, 2018), 16 pgs.
Constine, Josh, "Snapchat Launches Bitmoji TV: Zany 4-min Cartoons of Your Avatar", TechCrunch, [Online] Retrieved from the Internet: <URL: https://techcrunch.com/2020/01/30/bitmoji-tv/>, (Jan. 30, 2020), 13 pgs.
Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.
Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.
Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.
Macmillan, Douglas, "Snapchat Buys Bitmoji App for More Than $100 Million", The Wallstreet Journal, [Online] Retrieved from the Internet: <URL: https://www.wsj.com/articles/snapchat-buys-bitmoji-app-for-more-than-100-million-1458876017>, (Mar. 25, 2016), 5 pgs.
Newton, Casey, "Your Snapchat friendships now have their own profiles—and merchandise", The Verge, [Online] Retrieved from the Internet: <URL: https://www.theverge.com/2018/11/13/18088772/snapchat-friendship-profiles-bitmoji-merchandise-comics>, (Nov. 13, 2018), 5 pgs.
Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.
Ong, Thuy, "Snapchat takes Bitmoji deluxe with hundreds of new customization options", The Verge, [Online] Retrieved from the Internet on Nov. 2, 2018: <URL: https://www.theverge.com/2018/1/30/16949402/bitmoji-deluxe-snapchat-customization>, (Jan. 30, 2018), 2 pgs.
Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.
Reign, Ashley, "How To Add My Friend's Bitmoji To My Snapchat", Women.com, [Online] Retrieved from the Internet: <URL: https://www.women.com/ashleyreign/lists/how-to-add-my-friends-bitmoji-to-my-snapchat>, (Jun. 30, 2017), 7 pgs.
Tripathi, Rohit, "Watermark Images in PHP And Save File on Server", [Online] Retrieved from the Internet: <URL: http://code.

(56) References Cited

OTHER PUBLICATIONS rohitink.com/2012/12/28/watermark-images-in-php-and- save-file-on-server>, (Dec. 28, 2012), 4 pgs.

Tumbokon, Karen, "Snapchat Update: How To Add Bitmoji To Customizable Geofilters", International Business Times, [Online] Retrieved from the Internet : <URL: https://www.ibtimes.com/snapchat-update-how-add-bitmoji-customizable-geofilters-2448152>, (Nov. 18, 2016), 6 pgs.

* cited by examiner

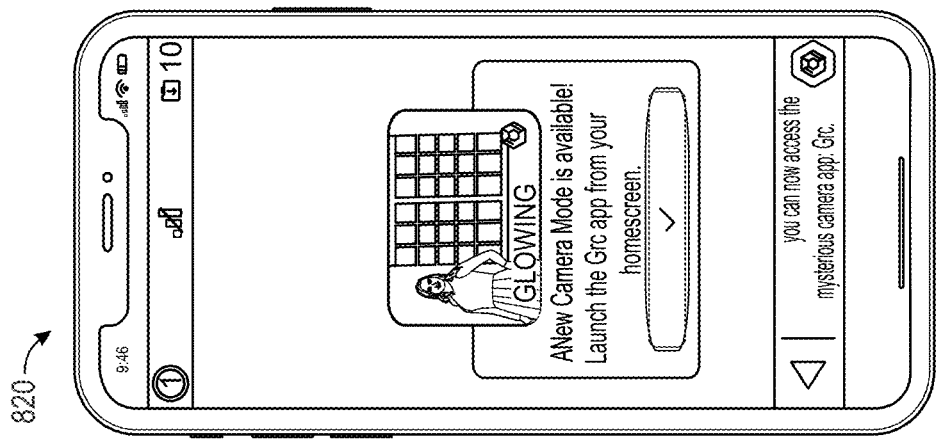
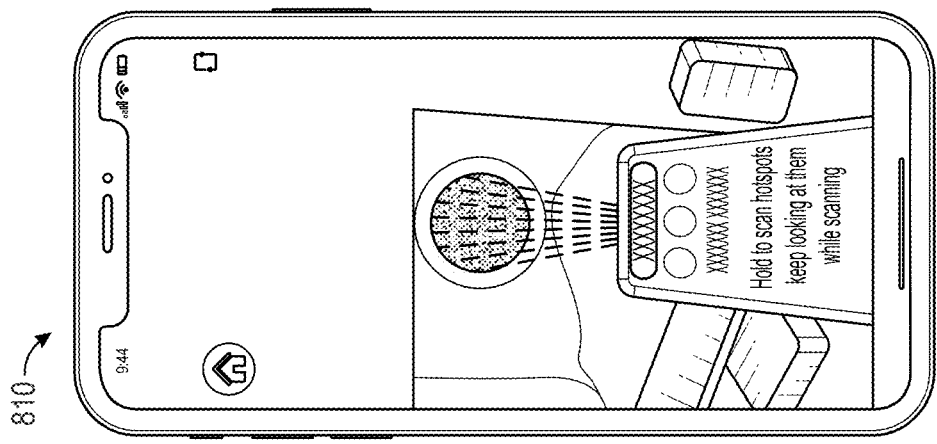
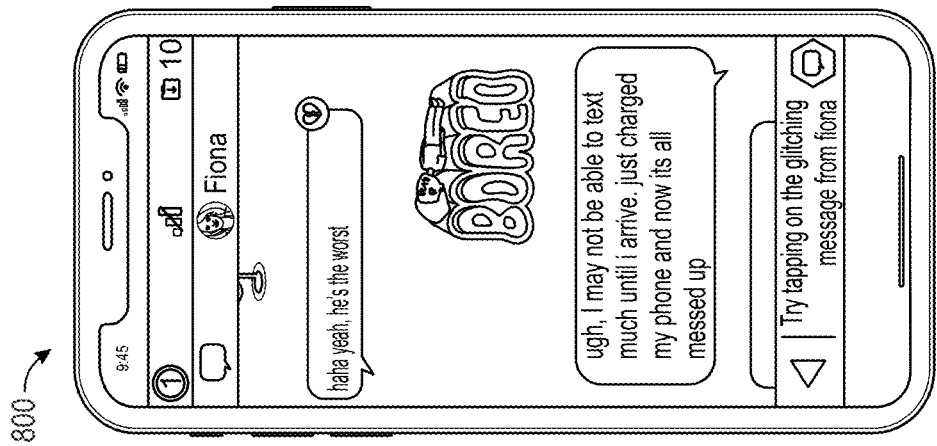
FIG. 8B

INTEGRATING AUGMENTED REALITY EXPERIENCES WITH OTHER COMPONENTS

CLAIM OF PRIORITY

This application is a continuation of U.S. patent application Ser. No. 17/845,496, filed on Jun. 21, 2022, the benefit of priority of which is claimed hereby, and which is incorporated by reference herein in its entirety.

TECHNICAL FIELD

The present disclosure relates generally to generating augmented reality (AR) experiences on messaging applications.

BACKGROUND

Augmented-Reality (AR) is a modification of a virtual environment. For example, in Virtual Reality (VR), a user is completely immersed in a virtual world, whereas in AR, the user is immersed in a world where virtual objects are combined or superimposed on the real world. An AR system aims to generate and present virtual objects that interact realistically with a real-world environment and with each other. Examples of AR applications can include single or multiple player video games, instant messaging systems, and the like.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which:

FIGS. 6, 7, 8A and 8B are diagrammatic representations of outputs of the component integration system, in accordance with some examples.

DETAILED DESCRIPTION

Figure 1:
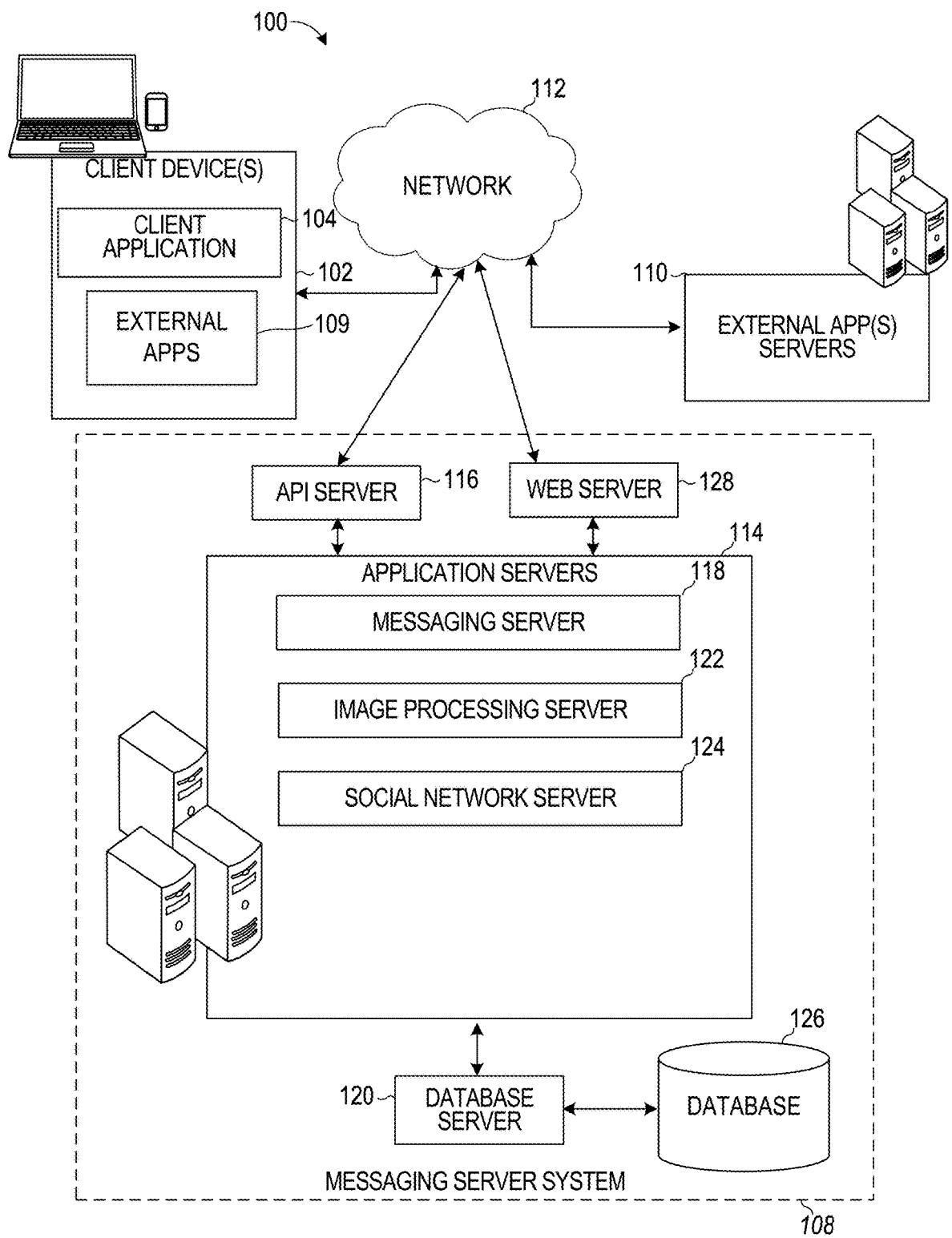
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Messaging applications typically enable end users to access various AR experiences by launching an AR experience bundle or package that includes the AR content associated with the AR experiences. The AR experiences typically present AR elements that are animated or that are anchored to particular positions. This allows the users to move around in the real-world and have the AR elements remain in place or move around in a similar manner. Messaging applications also allow users to access other features or components, such as messaging functions, map applications, avatar applications, and/or web-based applications (e.g., web-based gaming applications). Each of these features or components typically functions independently of each other so that operations performed on one component usually do not reflect operations performed by another component.

Because of the lack of interoperability between the various components available for use on the messaging applications, users are provided with disjoint experiences and can become frustrated having to repeat certain operations across multiple components. For example, a user may communicate with a friend on one component and may be interested in also interacting with the friend on an AR experience. To do so, the user has to re-establish a connection with the same friend on the AR experience by navigating through various pages of information and then having to wait for the friend to join the user in the AR experience. This type of interaction wastes a great deal of time and resources and causes users to lose interest in using the messaging applications and to become frustrated. Some typical systems attempt to address these issues by providing a limited amount of shared information between different components. However, the amount and type of data that can be shared between the components is predetermined and limited, which restricts developers from creating a diverse set of useful and engaging interactions, such as interactions involving AR experiences. This can reduce the interest level end users have in accessing the AR experiences, which causes missed opportunities.

The disclosed techniques solve these technical issues by providing a system that enables any type of data to be shared across all or some subset of components implemented by messaging applications. To do so, the disclosed techniques, executing on a computing system, access, by a messaging application implemented on a client device, a first component of a plurality of components implemented by the messaging application. The plurality of components include an AR experience and each of the plurality of components is configured to be separately launched by the messaging application. The disclosed techniques store a first state of the first component in a data structure that is shared across the plurality of components and launch, by the messaging application, a second component of the plurality of components in response to determining that an interaction has been performed using the first component. The disclosed techniques access, by the second component, the data structure to retrieve the first state of the first component and configure a second state of the second component that has been launched based on the first state of the first component. In some cases, the interaction with the first component can directly be communicated to the second component to configure the state of the second component (e.g., with or without being passed through the shared data structure).

For example, the user can interact with a web-based application (and/or mapping application) to reach a certain objective or goal or perform a task. Once that objective or goal is reached, the web-based application can launch the AR experience passing one or more parameters of the web-based application. The AR experience can be launched automatically (programmatically) in response to the objective or goal being reached and/or in response to presenting an option to the user to launch the AR experience. Once the AR experience is launched, the AR experience presents one or more AR elements related to the parameters received from the web-based gaming application. When a certain objective, goal, criterion, or level is reached in the AR experience, the AR experience automatically (programmatically) and/or in response to a specific request, resumes the web-based application and/or launches a new or different web-based application. The AR experience can provide one or more parameters of the AR experience that were generated during interaction and launch of the AR experience to the web-based application and/or the new or different web-based application. The user can continue interacting with the web-based application and/or the new or different web-based application based on the interactions the user performed with the AR experience.

In some examples, the user can interact with an AR experience to reach a certain objective or goal or perform a task. Once that objective or goal is reached, the AR experience can launch a web-based application (and/or mapping application) passing one or more parameters of the AR experience. The web-based application can be launched automatically (programmatically) in response to the objective or goal being reached and/or in response to presenting an option to the user to launch the web-based application. Once the web-based application is launched, the web-based application presents a display of a user interface related to the parameters received from the AR experience. When a certain objective, goal, criterion, or level is reached in the web-based application, the web-based application automatically (programmatically) and/or in response to a specific request, resumes the AR experience. The user can continue interacting with the AR experience based on the interactions the user performed with the web-based application.

In this way, the disclosed techniques provide an integrated, unified and seamless experience to a user allowing the user to dynamically interact with multiple components of the messaging application. This reduces the amount of information that needs to be re-entered and thereby reduces the overall amount of resources needed to accomplish a task.

In some examples, an AR development platform is provided to an AR experience developer. The AR development platform can present a user interface to the AR experience developer that enables the AR developer to select how various different components (implemented by different platforms of the messaging application) interact with each other and share data with each other to provide a unified experience to a user. This provides a greater amount of flexibility for a developer to create useful, interesting and engaging AR experiences without being restricted by the resource constraints of the messaging applications and/or client devices that run the AR experiences. In this way, the disclosed techniques improve the efficiency of using the electronic device and the overall experience of the user in using the electronic device.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a client application 104 and other external applications 109 (e.g., third-party applications). Each client application 104 is communicatively coupled to other instances of the client application 104 (e.g., hosted on respective other client devices 102), a messaging server system 108 and external app(s) servers 110 via a network 112 (e.g., the Internet). A client application 104 can also communicate with locally-hosted third-party applications, such as external apps 109, using Application Programming Interfaces (APIs). The client application 104 can include a messaging client, messaging application, and/or an AR developer application or an AR development client.

The messaging client or client application 104 can function as an operating system (or main application) and can implement and coordinate operation across multiple components including an AR experience, a map application, an avatar application, and/or a web-based application, such as a web-based gaming application. Each of the components, from a front-end user interface of the messaging client or client application 104, can be separately launched, such as by selecting a respective option from the front-end user interface. In some implementations, a first component can launch a second component and pass initialization parameters to the second component automatically, programmatically, in response to user input, and/or upon reaching a goal within the first component. This provides a seamless and unified user experience across multiple components to the user.

To ensure user data privacy, the client device 102 (or client application 104 implemented on the client device 102) may notify the user regarding the type of information that may be collected and prompt the user to choose whether to opt-in prior to collecting the data. The system will not collect the data if the user declines to opt-in and does not give consent. If the user opts-in, the data is stored securely in an encrypted manner on the server. To further ensure user data privacy, the client device 102 can notify a user if a given component launches or can be used to launch another component that uses a camera or microphone or other input device of the client device 102 that is not used by the given component.

The client device 102 may operate as a standalone device or may be coupled (e.g., networked) to other machines. In a networked deployment, the client device 102 may operate in the capacity of a server machine or a client machine in a server-client network environment, or as a peer machine in a peer-to-peer (or distributed) network environment. The client device 102 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the disclosed operations. Further, while only a single client device 102 is illustrated, the term "client device" shall also be taken to include a collection of machines that individually or jointly execute the disclosed operations.

In some examples, the client device 102 can include AR glasses or an AR headset in which virtual content is displayed within lenses of the glasses while a user views a real-world environment through the lenses. For example, an image can be presented on a transparent display that allows a user to simultaneously view content presented on the display and real-world objects.

In some examples, the client device 102 can be operated by an AR experience developer. In such cases, the AR experience developer (or AR developer) accesses an AR experience development platform. The AR experience development platform allows the AR developer to generate an AR experience bundle that includes a set of AR elements and events or triggers of different types that are used to control launching of another component, such as a web-based application, avatar application, or map application. In some examples, the AR developer can specify conditions under which the other component(s) is/are launched. The AR experience can access a shared data structure (e.g., storage location, file or element) that is also accessible to other components implemented by the client application 104. The shared data structure can store state information for one or more of the components and can be used to control a user interface and operation of any of the components. In this way, a specified set of operations that are performed by one component, such as an AR experience, can be used to modify operations performed by another component implemented by the same client application 104.

In some examples, the conditions used to launch one or more other components of the client application 104 that are tracked by a given component currently being accessed can include geographical locations, levels in a gaming application or AR experience, accomplishment of one or more goals, views or depictions of real-world environment portions, time, time of day, client device type, user type, user account type, location markers, image markers, or any other suitable condition. In some examples, the conditions can be manually programmed and stored as part of the AR experience bundle. In some examples, the conditions are set by the AR developer selecting between various options for setting certain conditions in association with a component.

The client application 104 is able to communicate and exchange data with other client applications 104 and with the messaging server system 108 via the network 112. The data exchanged between client applications 104, and between a client application 104 and the messaging server system 108, includes functions (e.g., commands to invoke functions) as well as payload data (e.g., text, audio, video or other multimedia data).

The messaging server system 108 provides server-side functionality via the network 112 to a particular client application 104. While certain functions of the messaging system 100 are described herein as being performed by either a client application 104 or by the messaging server system 108, the location of certain functionality either within the client application 104 or the messaging server system 108 may be a design choice. For example, it may be technically preferable to initially deploy certain technology and functionality within the messaging server system 108 but to later migrate this technology and functionality to the client application 104 where a client device 102 has sufficient processing capacity.

The messaging server system 108 supports various services and operations that are provided to the client application 104. Such operations include transmitting data to, receiving data from, and processing data generated by the client application 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the client application 104.

Turning now specifically to the messaging server system 108, an Application Programming Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the client application 104 in order to invoke functionality of the application servers 114. The API server 116 exposes various functions supported by the application servers 114, including account registration, login functionality, the sending of messages, via the application servers 114, from a particular client application 104 to another client application 104, the sending of media files (e.g., images or video) from a client application 104 to a messaging server 118, and for possible access by another client application 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the client application 104). In some examples, the API provides a set of interfaces that can be called or queried to pass or share parameters/data between different components of the client application 104.

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the client application 104. As will be described in further detail, the text and media content from multiple sources may be aggregated into collections of content (e.g., called stories or galleries). These collections are then made available to the client application 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
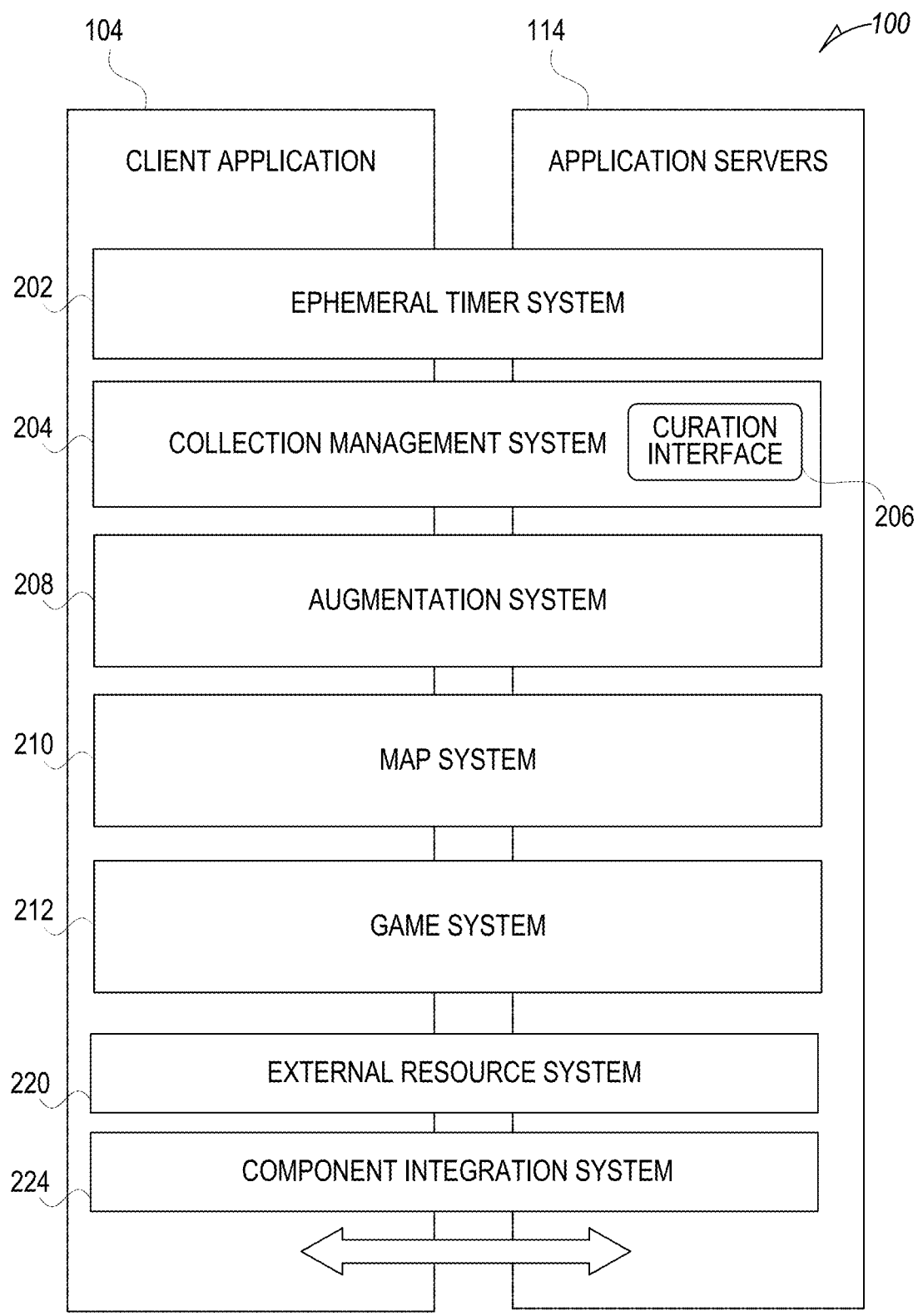
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality experiences on a client device 102 when an image is captured by the client device 102. Specifically, the client application 104 on the client device 102 can be used to activate a camera. The camera displays one or more real-time images or a video to a user along with one or more icons or identifiers of one or more augmented reality experiences. The user can select a given one of the identifiers to launch the corresponding AR experience or perform a desired image modification (e.g., replacing a garment being worn by a user in a video or recoloring the garment worn by the user in the video or modifying the garment based on a gesture performed by the user).

Figure 3:
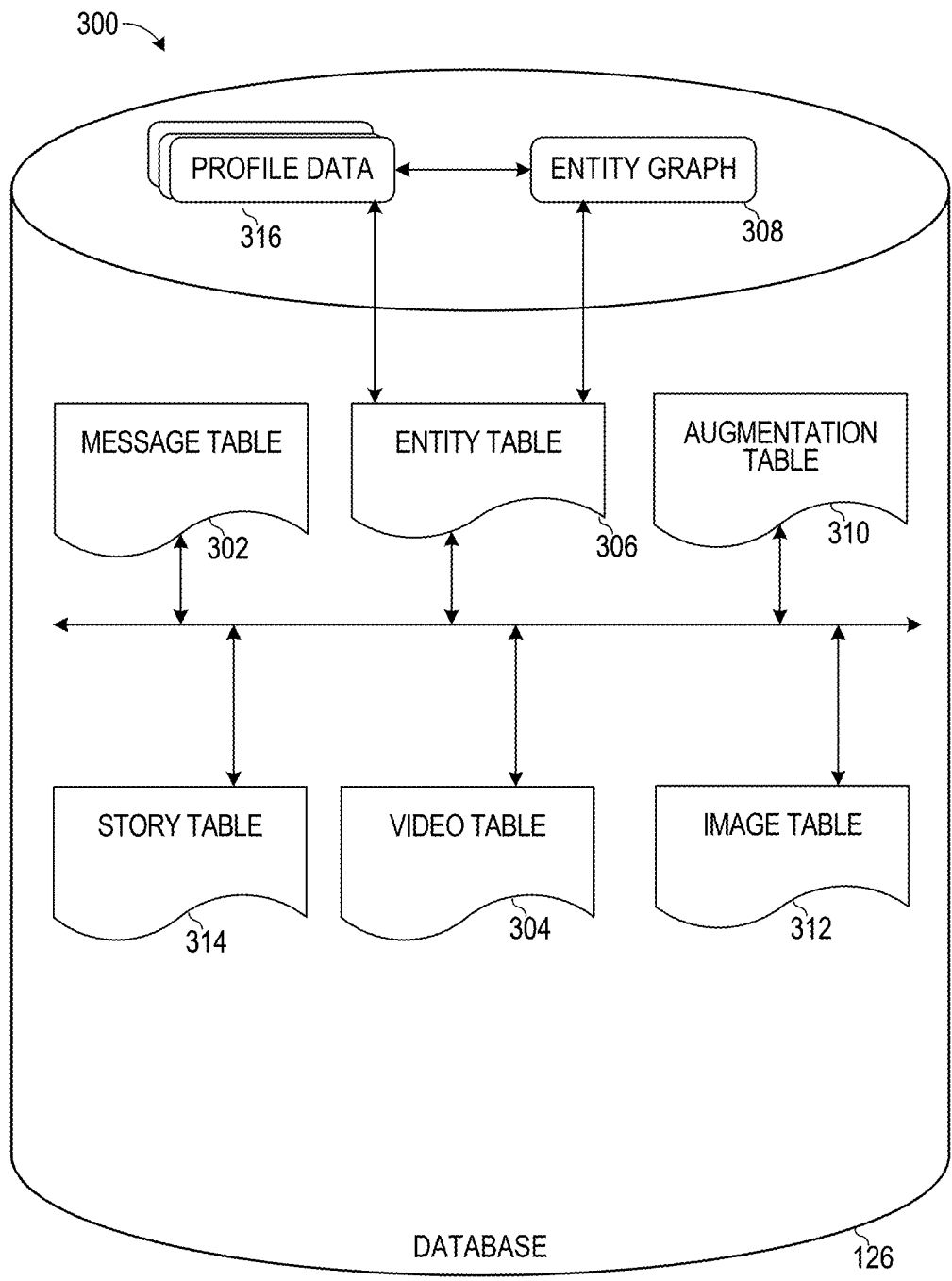
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the client application 104, features and functions of an external resource (e.g., a third-party application 109 or applet) are made available to a user via an interface of the client application 104. The client application 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the client application 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), also referred to as a component, the client application 104 determines whether the selected external resource is a web-based external resource or a locally-installed external application. In some cases, external applications 109 that are locally installed on the client device 102 can be launched independently of and separately from the client application 104, such as by selecting an icon, corresponding to the external application 109, on a home screen of the client device 102. Small-scale versions of such external applications (e.g., components) can be launched or accessed via the client application 104 and, in some examples, no or limited portions of the small-scale external application can be accessed outside of the client application 104. The small-scale external application can be launched by the client application 104 receiving, from an external app(s) server 110, a markup-language document associated with the small-scale external application and processing such a document. In some examples, the small-scale external application can be launched by another component, such as an AR experience, currently being accessed by the client application 104.

In response to determining that the external resource is a locally-installed external application 109, the client application 104 (e.g., in response to a command received from a given component, such as an AR experience running on the client device 102) instructs the client device 102 to launch the external application 109 by executing locally-stored code corresponding to the external application 109. In response to determining that the external resource is a web-based resource, the client application 104 communicates with the external app(s) servers 110 to obtain a markup-language document corresponding to the selected resource. The client application 104 then processes the obtained markup-language document to present the web-based external resource within a user interface of the client application 104.

The client application 104 can notify a user of the client device 102, or other users related to such a user (e.g., "friends"), of activity taking place in one or more external resources. For example, the client application 104 can provide participants in a conversation (e.g., a chat session) in the client application 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective client application 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the client application 104. The external resource can selectively include different media items in the responses, based on a current context of the external resource.

The client application 104 can present a list of the available external resources (e.g., components, third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The client application 104 can allow users to launch AR experiences with AR elements or events of different types. Specifically, the client application 104 can receive a request to access an AR experience. In response to receiving the request to access the AR experience, the client application 104 launches an AR experience bundle associated with the AR experience. As part of the AR experience bundle, the client application 104 accesses a list of event types or conditions associated with the AR experience used to launch another component, such as a map application or web-based application or resource. The list can include event types or conditions that are predefined and/or event types that are specifically configured and selected by the AR developer.

The client application 104 can determine that an interaction associated with the AR experience corresponds to a first event type of the list of event types or a first condition. The client application 104, in response to detecting the interaction, identifies one or more components associated with the first condition. The client application 104 can access current state information associated with the AR experience and launches the one or more components based on the current state information of the AR experience. The one or more components can be launched programmatically, automatically (without user input), or in response to presenting a prompt with a call to action option for the user to select to launch the one or more components. This allows the AR experience developer to enhance or improve certain features of the AR experience and unify such an experience across other components of the client application 104 (used to implement the AR experience) which improves the overall experience of end users.

In some examples, the client application 104 can present an AR developer interface. In such cases, the client application 104 can be operated by an AR developer to develop and create one or more AR experiences, as discussed below.

System Architecture

FIG. 2 is a block diagram illustrating further details regarding the messaging system 100, according to some examples. Specifically, the messaging system 100 is shown to comprise the client application 104 and the application servers 114. The messaging system 100 embodies a number of subsystems (also referred to as components), which are supported on the client side by the client application 104 and on the sever side by the application servers 114. These subsystems (or components) include, for example, an ephemeral timer system 202, a collection management system 204, an augmentation system 208, a map system 210, a game system 212, and an external resource system 220 (also referred to as a web-based application system).

The ephemeral timer system 202 is responsible for enforcing the temporary or time-limited access to content by the client application 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the client application 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the client application 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the client application 104 based on a geolocation of the client device 102. In another example, the augmentation system 208 operatively supplies a media overlay to the client application 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain augmented reality experiences and presents identifiers of such experiences in one or more user interfaces (e.g., as icons over a real-time image or video or as thumbnails or icons in interfaces dedicated for presented identifiers of augmented reality experiences). Once an augmented reality experience is selected, one or more images, videos, or augmented reality graphical elements are retrieved and presented as an overlay on top of the images or video captured by the client device 102. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions) as well as other payload data (e.g., text, audio, video or other multimedia data), such as during a video call between a plurality of users or participants.

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging, video call, group video call, and so forth) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions, and supports the presentation of map-based media content and messages by the client application 104. For example, the map system 210 enables the display of user icons or avatars (e.g., stored in profile data 316, shown in FIG. 3) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the client application 104. A user can furthermore share his or her location and status information (e.g., using an appropriate status avatar) with other users of the messaging system 100 via the client application 104, with this location and status information being similarly displayed within the context of a map interface of the client application 104 to selected users.

The game system 212 provides various gaming functions within the context of the client application 104. The client application 104 provides a game interface providing a list of available games (e.g., web-based games or web-based applications) that can be launched by a user within the context of the client application 104, and played with other users of the messaging system 100. The messaging system 100 further enables a particular user to invite other users to participate in the play of a specific game, by issuing invitations to such other users from the client application 104. The client application 104 also supports both voice and text messaging (e.g., chats) within the context of gameplay, provides a leaderboard for the games, and also supports the provision of in-game rewards (e.g., coins and items).

The external resource system 220 provides an interface for the client application 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the client application 104). The client application 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the client application 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the client application 104 into the web-based resource.

The SDK stored on the messaging server 118 effectively provides the bridge between an external resource (e.g., third-party or external applications 109 or applets and the client application 104). This provides the user with a seamless experience of communicating with other users on the client application 104, while also preserving the look and feel of the client application 104. To bridge communications between an external resource and a client application 104, in certain examples, the SDK facilitates communication between external resource servers 110 and the client application 104. In certain examples, a WebViewJavaScriptBridge running on a client device 102 establishes two one-way communication channels between an external resource and the client application 104. Messages are sent between the external resource and the client application 104 via these communication channels asynchronously. Each SDK function invocation is sent as a message and callback.

Each SDK function is implemented by constructing a unique callback identifier and sending a message with that callback identifier.

By using the SDK, not all information from the client application 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the client application 104. Once the user selects the visual representation or instructs the client application 104 through a GUI of the client application 104 to access features of the web-based external resource, the client application 104 obtains the HTML5 file and instantiates the resources necessary to access the features of the web-based external resource.

The client application 104 presents a graphical user interface (e.g., a landing page or title screen) for an external resource. During, before, or after presenting the landing page or title screen, the client application 104 determines whether the launched external resource has been previously authorized to access user data of the client application 104. In response to determining that the launched external resource has been previously authorized to access user data of the client application 104, the client application 104 presents another graphical user interface of the external resource that includes functions and features of the external resource. In response to determining that the launched external resource has not been previously authorized to access user data of the client application 104, after a threshold period of time (e.g., 3 seconds) of displaying the landing page or title screen of the external resource, the client application 104 slides up (e.g., animates a menu as surfacing from a bottom of the screen to a middle or other portion of the screen) a menu for authorizing the external resource to access the user data. The menu identifies the type of user data that the external resource will be authorized to use. In response to receiving a user selection of an accept option, the client application 104 adds the external resource to a list of authorized external resources and allows the external resource to access user data from the client application 104. In some examples, the external resource is authorized by the client application 104 to access the user data in accordance with an OAuth 2 framework.

The client application 104 controls the type of user data that is shared with external resources and between components implemented by the client application 104 based on the type of external resource or component being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The component integration system 224 can access, by a messaging application implemented on a client device 102, a first component of a plurality of components implemented by the messaging application. The plurality of components can include an AR experience and each of the plurality of components can be configured to be separately launched by the messaging application. The component integration system 224 stores a first state of the first component in a data structure that is shared across the plurality of components, such as in one of the data structures 300 (FIG. 3). The component integration system 224 launches, by the messaging application, a second component of the plurality of components in response to determining that an interaction has been performed using the first component. The component integration system 224 accesses, by the second component, the data structure to retrieve the first state of the first component and configures a second state of the second component that has been launched based on the first state of the first component. An integration between the plurality of components including at least the AR experience can be developed using an AR developer platform.

In some examples, the first component includes the AR experience and the second component includes at least one of a web-based application, a map application, or an avatar application. In some examples, the second component includes the AR experience and the first component includes at least one of a web-based application, a map application, or an avatar application.

The component integration system 224 can determine that the interaction has been performed using the first component by determining that input has been received from a user corresponding to a specified gesture. In such cases, the component integration system 224 executes, by the first component, a call to action operation associated with the second component to launch the second component. The component integration system 224, in response to determining that the input has been received corresponding to the specified gesture, displays by the first component a prompt with an option to execute the call to action operation. The component integration system 224 receives a second input that selects the option to execute the call to action operation.

The component integration system 224 can determine that the interaction has been performed using the first component by determining that a goal has been reached during use of the first component. In such cases, the component integration system 224, in response to determining that the goal has been reached, automatically executes, by the first component, a call to action operation associated with the second component to launch the second component.

In some examples, the component integration system 224 replaces a display of the first component with a display of the second component in response to launching the second component. In such cases, the component integration system 224 detects a specified interaction performed using the second component and updates the data structure to represent a current state of the second component. The component integration system 224 re-accesses the first component based on the updated data structure in response to detecting the specified interaction performed using the second component. The display of the second component can be replaced with the display of the first component after the first component is re-accessed.

In some examples, the component integration system 224 detects a specified interaction performed using the second component and updates the data structure to represent a current state of the second component. In such cases, the component integration system 224 launches, by the second component, a third component of the plurality of components based on the updated data structure in response to detecting the specified interaction performed using the second component. The display of the second component can be replaced with a display of the third component after the third component is launched.

In some examples, the first component includes the AR experience and the second component includes a web-based application. The state of the first component can include a payload of parameters of the AR experience which is used to adjust one or more parameters of the second component to provide a unified multi-component experience to a user.

In some examples, the component integration system 224 generates for display a first user interface associated with the AR experience in response to receiving a user selection of an option to separately launch the second component comprising the AR experience. The component integration system 224 generates for display a second user interface associated with the AR experience in response to launching the second component in response to the interaction performed using the first component. One or more options available in the first user interface can be disabled in the second user interface.

In some examples, the first component includes the AR experience and the second component comprises a map application. In such cases, the component integration system 224 applies, by the first component, one or more AR elements to a real-world object depicted in an image captured by a camera of the client device 102, the real-world object being associated with real-world location. The component integration system 224 stores data representing the one or more AR elements and the real-world location as the first state in the data structure and navigates a map displayed by the map application to a region including the real-world location. The component integration system 224 modifies a portion of the region of the map corresponding to the real-world object to include the one or more AR elements. The client device 102 can include a first client device 102 associated with a first user, wherein the first component includes the AR experience being accessed by the first client device 102 and the map application being accessed by a second client device 102 to display the modified portion of the region of the map on the second client device associated with a second user. In this way, operations performed by the first client device 102 with respect to an AR experience can be reflected by another component, such as a map application, (that is distinct from the AR experience) that is accessed by another user on the second client device 102.

In some examples, the first component includes a web-based application and the second component includes the AR experience. In such cases, the component integration system 224 navigates an avatar in the web-based application to a virtual location and determines a condition indicating that the virtual location is associated with the AR experience including activation of a front-facing camera of the client device. The component integration system 224, in response to navigating the avatar in the web-based application to the virtual location, adds one or more AR elements of the AR experience to a real-time video feed captured by the front-facing camera of the client device 102. The component integration system 224 presents the real-time video feed that includes the one or more AR elements within a display of the web-based application.

In some examples, the first component includes a web-based application and the second component includes the AR experience. In such cases, the component integration system 224 receives input by the web-based application comprising selection of a virtual item and determines that the selection of the virtual item is associated with the AR experience including activation of a rear-facing camera of the client device. The component integration system 224, in response to receiving the input by the web-based application comprising selection of the virtual item, adds one or more AR elements of the AR experience representing the virtual item to a real-time video feed captured by the rear-facing camera of the client device. The component integration system 224 presents the real-time video feed that includes the one or more AR elements representing the virtual item of the web-based application.

In some examples, the first component includes the AR experience and the second component includes a web-based application. In such cases, component integration system 224 performs a series of operations including: presenting, by the AR experience, a first AR element comprising a virtual device; in response to receiving input by the AR experience to unlock the virtual device, causing the web-based application to present a keypad; receiving, by the web-based application, a request for a passcode hint; in response to receiving the request for the passcode hint, causing the AR experience to present one or more AR elements representing the passcode hint over a real-time video feed captured by a camera of the client device; receiving, by the web-based application, interaction with the keypad comprising a correct passcode associated with the passcode hint represented by the one or more AR elements; and enabling, by the web-based application, a user to interact with the virtual device in response to receiving the interaction with the keypad.

The component integration system 224 can also perform one or more interactions with the AR experience after access to the virtual device has been enabled and determines, by the AR experience, that the one or more interactions correspond to a goal. In such cases, the component integration system 224, in response to determining that the one or more interactions correspond to the goal, can unlock access, by the web-based application, to other features of the virtual device.

This functionality provides a greater amount of flexibility for a developer to create useful, interesting, unified, and engaging AR experiences across different components without being restricted by the resource constraints of the messaging applications and/or client devices that run the AR experiences.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a username, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by client applications 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the client application 104 when the sending user is composing a message. Other types of filters include geolocation filters (also known as geo-filters), which may be presented to a sending user based on geographic location. For example, geolocation filters specific to a neighborhood or special location may be presented within a user interface by the client application 104, based on geolocation information determined by a Global Positioning System (GPS) unit of the client device 102.

Another type of filter is a data filter, which may be selectively presented to a sending user by the client application 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying augmented reality experiences). An augmented reality content item or augmented reality item may be a real-time special effect and sound that may be added to an image or a video.

As described above, augmentation data includes augmented reality content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a client application 104 operating on the client device 102. The transformation system operating within the client application 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the client application 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. users whose client devices have location services enabled and are at a common location event at a particular time may, for example, be presented with an option, via a user interface of the client application 104, to contribute content to a particular live story. The live story may be identified to the user by the client application 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
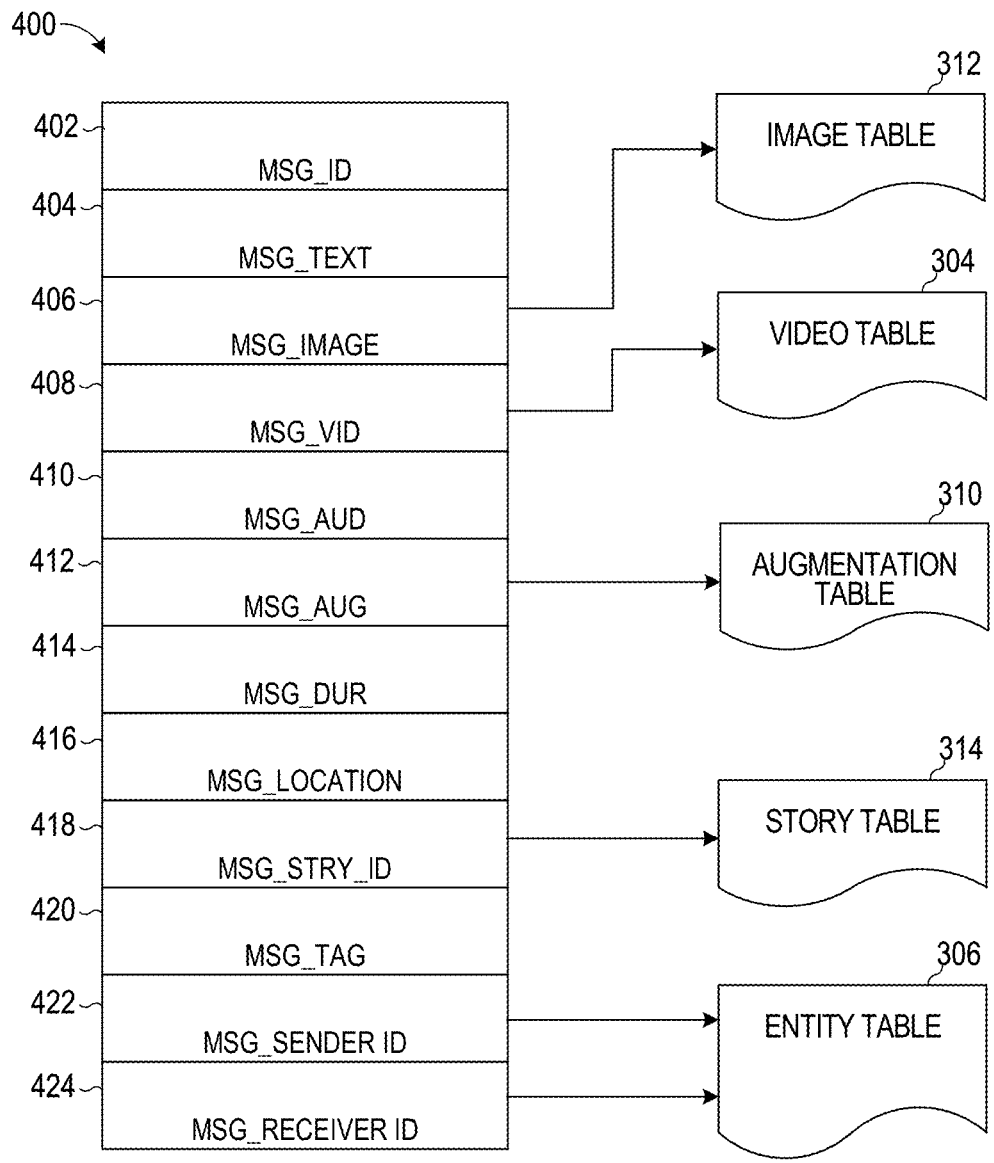
FIG. 4 is a diagrammatic representation of a message, in accordance with some examples.

FIG. 4 is a schematic diagram illustrating a structure of a message 400, according to some examples, generated by a client application 104 for communication to a further client application 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the client application 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Component Integration System

Figure 5:
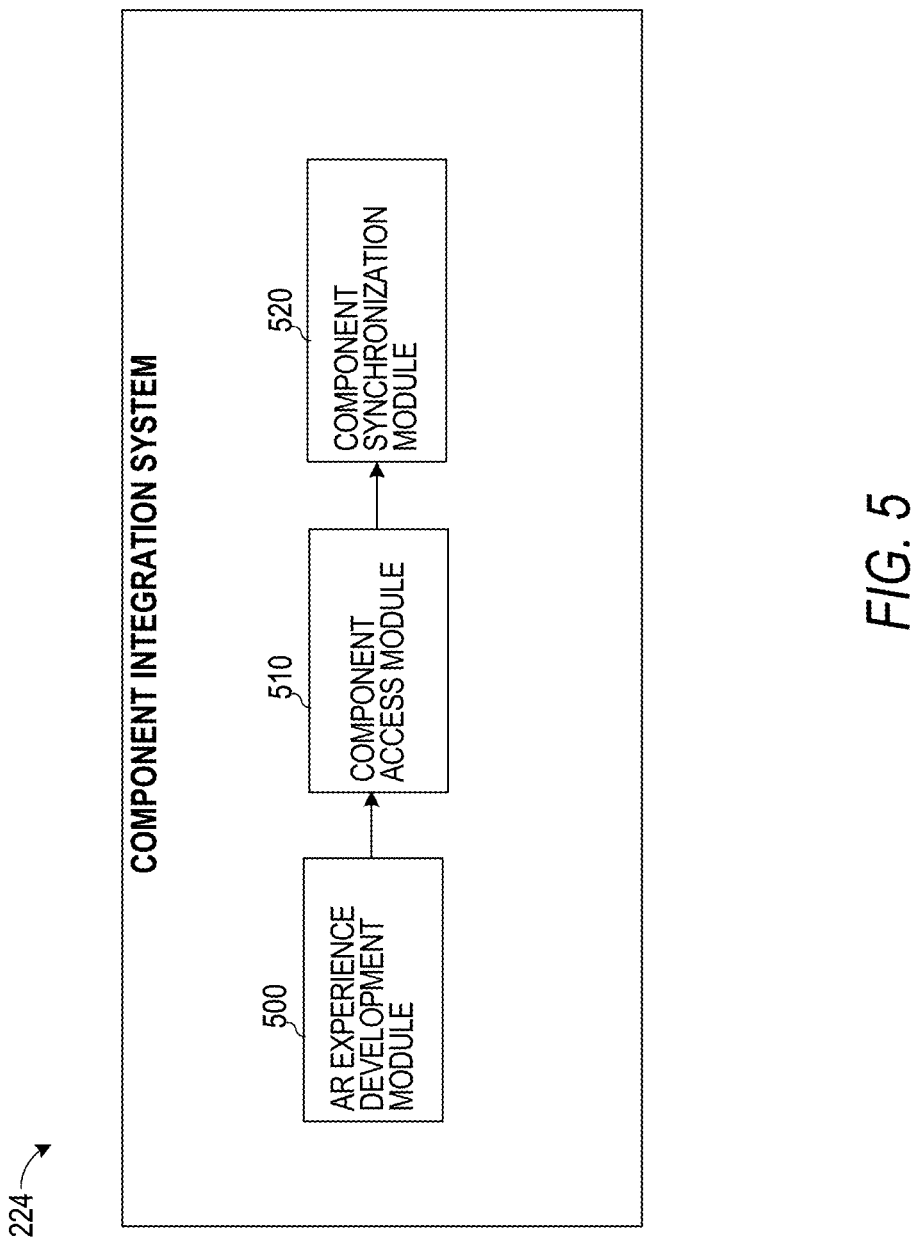
FIG. 5 is a block diagram showing an example component integration system, according to some examples.
Figure 6:
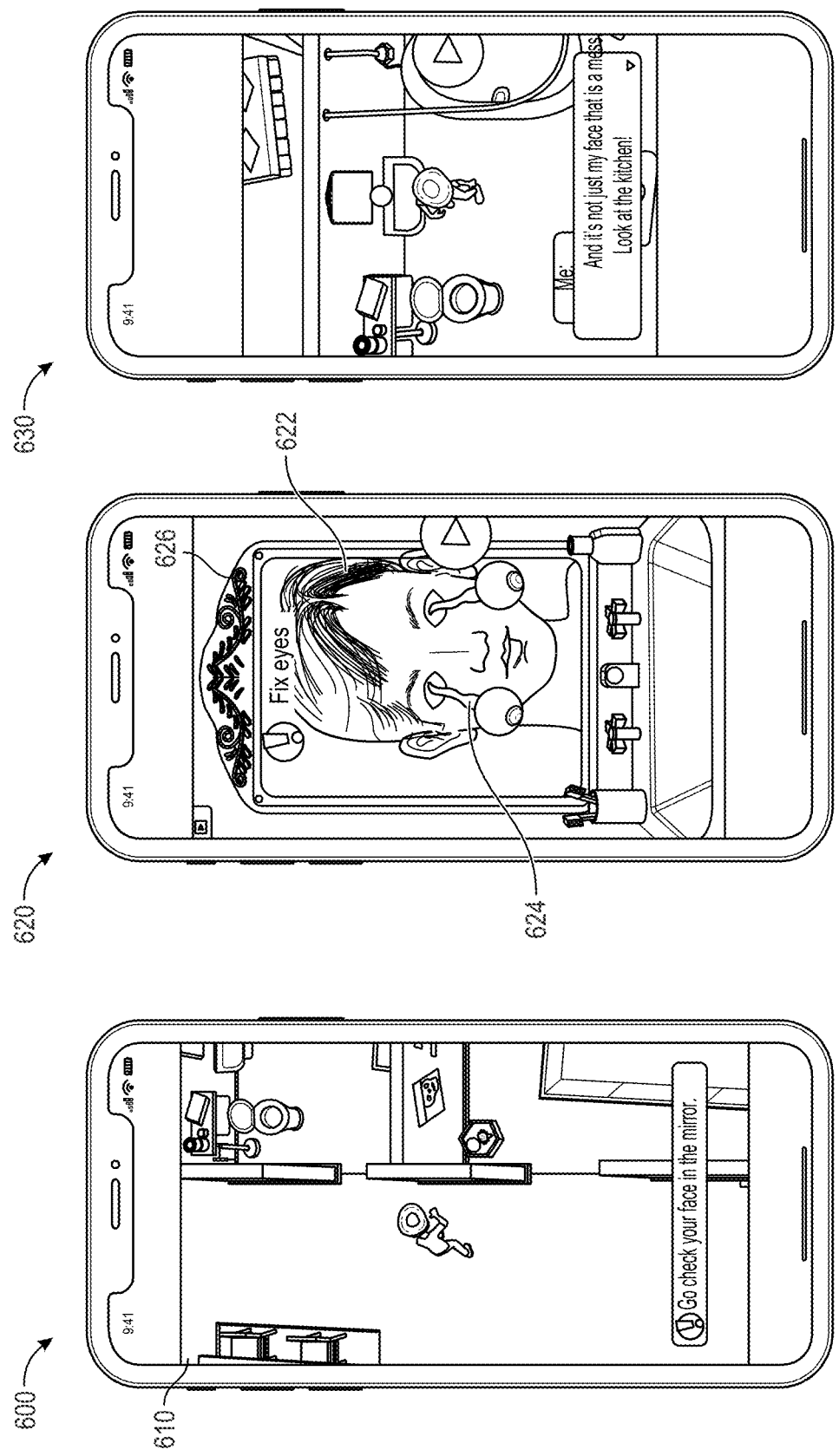

FIG. 5 is a block diagram showing an example component integration system 224, according to some examples. The component integration system 224 includes an AR experience development module 500, a component access module 510, and a component synchronization module 520.

The AR experience development module 500 generates user interfaces for presentation to an AR developer on an AR developer client device 102. The user interfaces enable the AR developer to select AR events and conditions to control launching of other components on one or more client devices 102. As referred to herein, an "AR experience bundle" or "AR bundle" represents a set of AR elements (including standard AR elements and linked AR elements) and corresponding code that indicates the visual appearance, interaction and behavior of each of the AR elements. The AR bundle includes the code necessary for a client device 102 to launch and execute the AR experience associated with the AR bundle. The AR bundle includes conditions or parameters that are tracked and used to store a current state of the AR experience. The conditions are consistently or periodically tracked to identify one or more other components to launch on the client device 102 based on one or more interactions performed on the AR experience. In some cases, another component can pass parameters to the AR bundle which are used by the other component to initiate and launch the AR experience in a particular state.

In some examples, the AR experience development module 500 receives a request from a developer client device 102 to access a developer user interface. For example, the AR experience development module 500 receives login credentials from the developer client device 102. The AR experience development module 500 can search for an account associated with the login credentials and generate a graphical user interface associated with the account for presentation to the developer client device 102. The AR experience development module 500 presents, in the graphical user interface, a plurality of AR experience bundles associated with the account. In some cases, the account is accessible to an organization, in which case multiple users within the organization can share access to the account and can view the same set of AR experience bundles.

The AR experience development module 500 can receive input from the developer client device 102 that selects a given AR experience bundle. In response to receiving the input, the AR experience development module 500 presents a graphical user interface. The AR experience development module 500 includes, in the graphical user interface, an identifier of the AR experience bundle and a list of AR events, conditions or triggers that are included in the AR experience bundle and which control launching of another component during execution of the AR experience.

An AR event, condition, or trigger can include or represent a specified action, goal, or object that is associated with the AR experience. For example, the AR event, condition, or trigger can include any combination of a custom event, a camera event (specifying activation of a front or rear facing camera), a face found event, a face lost event, an object tracking criterion, a 3D object tracking criterion, a marker tracking component, a tap event, a touch started event, a touch moved event, a touch ended event, a shared session event, a shared session joined event, a voice command event, a voice transcription event, and/or a language event. The list can also include one or more AR elements or objects. The AR elements can include 2D meshes, 3D meshes, videos, audio files, image files, and/or machine learning models. The AR event, condition, or trigger can include combinatorial logic that is used to determine when to assert an operation or call to action for launching another component. For example, when the combinatorial logic asserts an output, the AR bundle identifies a second component (e.g., map application or web-based application) associated with the combinatorial logic. The AR bundle writes or stores a current state of the AR experience in a shared data structure for access by the second component. Then, the AR bundle instructs the client device 102 to launch the second component which uses the data structure to configure a state of the second component.

The AR experience development module 500 can receive input that selects a given AR event or condition or combinatorial logic. For example, the conditions or combinatorial logic specify a level of subscription of an end user, a geographical region associated with the end user, a time of day, a type of AR experience, geographical locations, goal, levels in a gaming application or AR experience, views or depictions of real-world environment portions, a request from an end user to enable persisting the AR object or element, time, location markers, image markers, or any other suitable condition.

In some examples, the client device 102 determines that a particular interaction (e.g., a particular camera view, such as a front-facing camera view, a rear-facing camera view, or that a specified real-world object is detected in a captured image) corresponds to a given condition associated with the AR experience. In such cases, the client device 102 aggregates the interaction into an entity or data structure associated with the given condition. If the condition is satisfied, the client device 102 identifies a second component associated with the condition and launches the second component using the aggregated interaction.

In some examples, the component access module 510 launches a first component, such as a web-based application, avatar application, map application, or AR experience. The first component can be launched on a first client device 102. For example, the client application 104 presents a user interface to a first user on the first client device 102. In one example, the user interface includes a plurality of options each associated with a different component implemented by the client application 104. In response to receiving a user selection of an option associated with the first component, the client application 104 launches the first component and presents or generates a display that includes a user interface of the first component.

The component access module 510 can retrieve a set of conditions associated with the first component. The set of conditions control when and which parameters to pass to a second and/or third component of the client application 104 during access of the first component. The set of conditions can be stored or configured into the component synchronization module 520. The set of conditions can also control what type of data or information is shared between the various components during access of the first component. The data or information is stored in a shared data structure by the component synchronization module 520.

The component synchronization module 520 can monitor progress or interactions performed by a user during access of the first component on the first client device 102. For example, the component synchronization module 520 detects that a particular interaction or set of interactions corresponds to a condition stored by the component synchronization module 520. For example, the first component includes a web-based application and the condition represents a level, virtual room, or set of actions, such as navigating an avatar to a particular virtual location within the web-based application. In such cases, the component synchronization module 520 identifies a second component (which can be of a different type than the first component) that is associated with the condition. The component synchronization module 520 programmatically, automatically, or in response to a user confirmation or selection of an option from a displayed prompt, launches the second component. The component synchronization module 520 provides, to the component access module 510, an identification of the second component and a set of configuration data from the shared data structure to initiate the launch of the second component into a particular state. The component access module 510 launches the second component in the particular state. For example, the second component can be an AR experience which presents one or more AR elements corresponding to the level, virtual room, or set of actions, such as navigating an avatar to a particular virtual location within the web-based application that was performed on the web-based application.

The component access module 510 can monitor progress or interactions performed by a user during access of the second component on the first client device 102. For example, the component synchronization module 520 detects that a particular interaction or set of interactions corresponds to a condition stored by the component synchronization module 520 for the second component. For example, the second component includes the AR experience and the condition can represent a user interaction with one or more of the AR elements presented within a real-time video feed captured by the first client device 102 and presented on the first client device 102. In such cases, the component synchronization module 520 identifies the first component and/or a third component (which can be of a different type than the first/second components) that is associated with the condition satisfied by the interaction with the second component. The component synchronization module 520 programmatically, automatically, or in response to a user confirmation or selection of an option from a displayed prompt, launches the first and/or third components. The component synchronization module 520 provides, to the component access module 510, an identification of the first and/or third components and a set of configuration data from the shared data structure to initiate the launch of the first and/or third component into a particular state. The component access module 510 launches the first and/or third component in the particular state. In this way, interactions performed on one component are used to control a state of another component in a seamless and unified manner.

In some examples, the first component includes an AR experience and the condition represents a level, goal, set of interactions with virtual elements or AR elements displayed in the AR experience over a real-world environment depicted in a captured video stream, virtual room, or set of actions. In such cases, the component synchronization module 520 identifies a second component (which can be of a different type than the first component) that is associated with the condition. The component synchronization module 520 programmatically, automatically, or in response to a user confirmation or selection of an option from a displayed prompt, launches the second component. The component synchronization module 520 provides, to the component access module 510, an identification of the second component and a set of configuration data from the shared data structure to initiate the launch of the second component into a particular state. The component access module 510 launches the second component in the particular state. For example, the second component is a web-based application which presents a user interface associated with the one or more AR elements interacted with using the AR experience.

The component access module 510 monitors progress or interactions performed by a user during access of the second component on the first client device 102. For example, the component synchronization module 520 detects that a particular interaction or set of interactions corresponds to a condition stored by the component synchronization module 520 for the second component. When a condition is satisfied by the interactions performed using the second component, the component synchronization module 520 identifies the first component and/or a third component (which can be of a different type than the first/second components) that is associated with the condition satisfied by the interaction with the second component. The component synchronization module 520 programmatically, automatically, or in response to a user confirmation or selection of an option from a displayed prompt, launches the first and/or third components. The component synchronization module 520 provides, to the component access module 510, an identification of the first and/or third components and a set of configuration data from the shared data structure to initiate the launch of the first and/or third component into a particular state. The component access module 510 launches the first and/or third component in the particular state. In this way, interactions performed on one component are used to control a state of another component in a seamless and unified manner.

FIGS. 6, 7, 8A and 8B are diagrammatic representations of outputs of the component integration system 224, in accordance with some examples. For example, as shown in the set of user interfaces 600 of FIG. 6, a user input may be received requesting to launch a web-based application. The component integration system 224 receives the input and launches the web-based application. In response, the component integration system 224 presents a first user interface 610 in which graphical elements of the web-based application are displayed. The first user interface 610 includes an avatar that a user can control. In some examples, the avatar is controlled by the user to walk to a virtual location, such as a virtual bathroom. This can be in response to a message informing the user to check out the face of the avatar in the mirror.

In response to determining that the avatar has been moved or navigated to the virtual bathroom location, the component integration system 224 can determine that a condition is satisfied. The condition can be associated with launching an AR experience. In such cases, the component integration system 224 presents one or more graphical elements of the web-based application corresponding to the virtual bathroom location. For example, as shown in the user interface 620, the component integration system 224 displays a graphical mirror 626 which is part of the web-based application. The component integration system 224 also launches the AR experience with an indication of AR elements to present on a particular portion of a face.

The component integration system 224 can instruct the AR experience to activate a front-facing camera of the client device 102. In one example, the component integration system 224 requests input from the user to allow access to the front-facing camera (e.g., before the web-based application is launched and/or in response to triggering the condition that launches the AR experience). If the user allows the front-facing camera to be used, the component integration system 224 captures a real-time video stream from the camera and displays the real-time video stream in a specified portion of the user interface of the web-based application, such as in a portion surrounded by the virtual mirror 626. The AR experience can detect a real-world facial element, such as eyes of the user 622, in the video stream and display one or more animated AR elements 624 over or adjacent to the detected facial element. In this way, the component integration system 224 integrates some visual elements of the web-based application together with visual elements of the AR experience to provide a unified experience.

The component integration system 224 can detect that a certain condition is met, such as a user selecting an exit option or performing certain movement detected by the front-facing camera. In response, the component integration system 224 exits the AR experience and returns the user to the display of the web-based application, shown in user interface 630.

Figure 7:
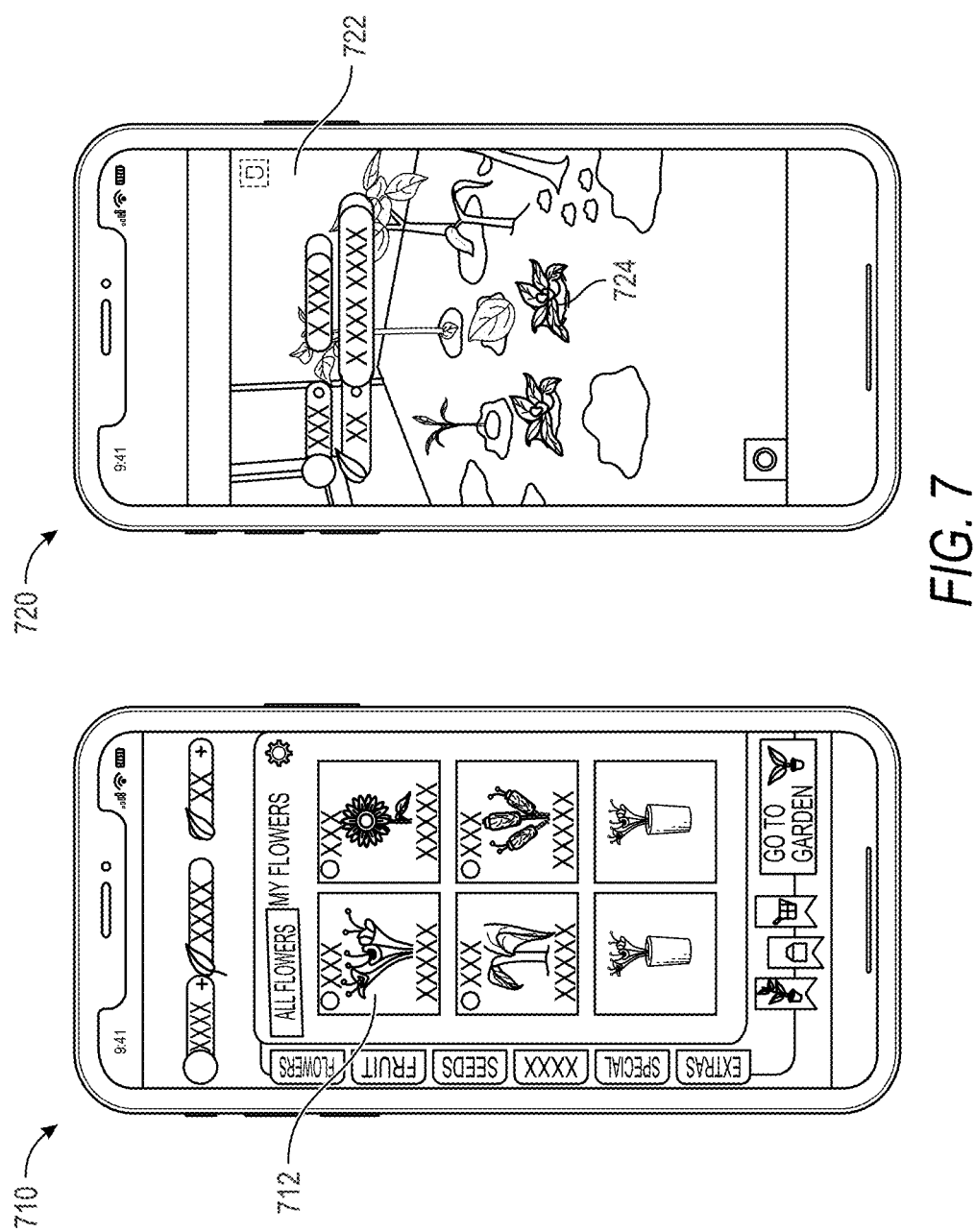

In some examples, as shown in the set of user interfaces 700 of FIG. 7, a user input may be received requesting to launch a web-based application. The component integration system 224 receives the input and launches the web-based application. In response, the component integration system 224 presents a first user interface 710 in which graphical elements 712 of the web-based application are displayed. The first user interface 710 includes a menu of virtual items, such as virtual flowers. The web-based application detects a selection of a given one of the graphical elements 712. This triggers a condition for launching an AR experience.

Specifically, in response to determining that the given one of the graphical elements 712 has been selected, the component integration system 224 determines that a condition is satisfied. In one example, the condition is associated with launching an AR experience. In such cases, the component integration system 224 instructs the AR experience to activate a rear-facing camera of the client device 102. The component integration system 224 passes one or more parameters of the web-based application that identify the given one of the graphical elements 712 that has been selected. The component integration system 224 requests input from the user to allow access to the rear-facing camera (e.g., before the web-based application is launched and/or in response to triggering the condition that launches the AR experience). If the user allows the rear-facing camera to be used, the component integration system 224 captures a real-time video stream from the rear-facing camera and displays the real-time video stream in a user interface 720. The AR experience can display one or more animated AR elements 724 over or adjacent to one or more real-world objects 722 depicted in the video stream. The AR elements 724 can represent AR counterparts (e.g., 3D flowers) of the virtual item (e.g., virtual flower) corresponding to the given one of the graphical elements 712 that was selected from the user interface of the web-based application. In this way, the component integration system 224 integrates some features of the visual elements of the web-based application into the visual elements of the AR experience to provide a unified experience.

Figure 8A:
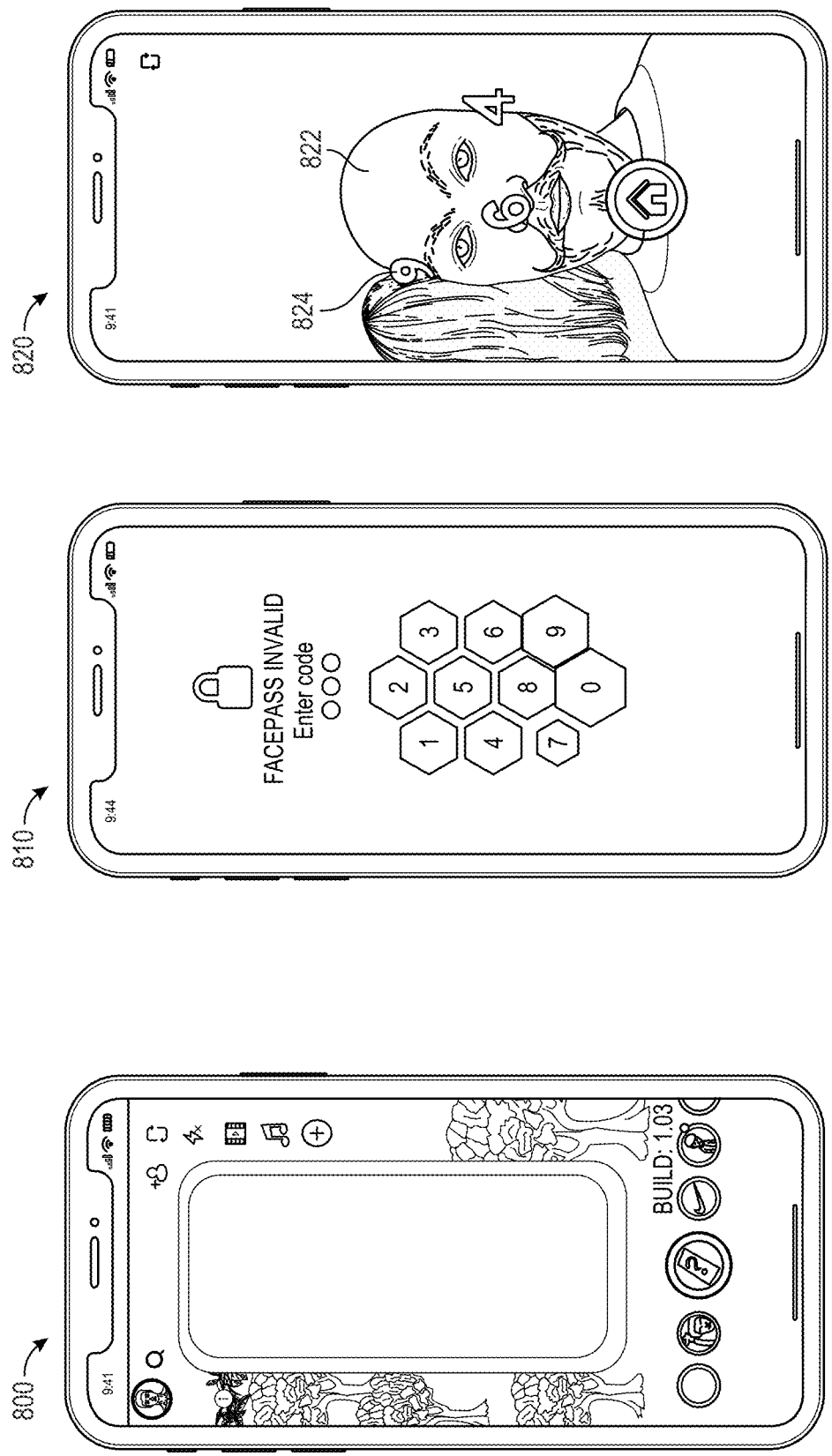

In some examples, as shown in FIG. 8A, a user input is received requesting to launch an AR experience. The component integration system 224 receives the input and launches the AR experience. In response, the component integration system 224 presents a first user interface 800 in which AR elements of the AR experience are displayed. The AR elements can include a virtual device, such as a virtual phone displayed over a real-world environment depicted in a real-time video feed captured by a front-facing or rear-facing camera of the client device 102 and presented on the screen.

The AR experience detects a an interaction, such as a user selection of the virtual AR device that is displayed. This interaction triggers a condition for launching a web-based application. In this case, the interaction includes a request to access or use the virtual AR device. The component integration system 224 provides parameters of the virtual AR device to the web-based application with an instruction to launch the web-based application. The web-based application presents a user interface 810 in place of the user interface 800 associated with the AR experience. The user interface 810 includes graphical elements of the web-based application, such as a virtual keypad. The web-based application receives input that selects a certain combination of keys of the virtual keypad and determines if the combination matches a predetermined combination or code. In response to the web-based application determining that the combination fails to match the predetermined combination or code, the web-based application presents a message indicating that the facepass is invalid.

In response to determining the number of times combinations entered by the user fail to match the predetermined combination or code, the web-based application determines that a condition for launching or re-accessing the AR experience is satisfied. In such cases, the web-based application retrieves a set of characters and pass those characters to the AR experience for presentation as AR elements. The web-based application launches the AR experience with instruction to activate a front-facing camera of the client device 102 in which a real-world environment is captured. The web-based application also instructs the AR experience to display an animated representation of the set of characters, such as using animated 3D AR elements. For example, as shown in user interface 820, the AR experience presents a real-time video feed depicting a face of a user 822 and one or more 3D AR elements 824 corresponding to the set of characters received from the web-based application. After a threshold period of time elapses or in response to input from a user, the AR experience is terminated and the web-based application user interface 810 is re-displayed. The web-based application allows the user to input the combination again corresponding to the 3D AR elements that were presented by the AR experience.

In response to the web-based application determining that the combination matches the predetermined combination or code, the web-based application presents a user interface 830, shown in FIG. 8B. The user interface 830 represents visual elements of an unlocked virtual device. The web-based application receives input from the user interacting with an option presented on the virtual device to access an AR gaming experience. In response, the web-based application instructs the AR gaming experience to activate a rear-facing camera of the client device 102. The web-based application provides data for rendering one or more AR elements over the real-time video feed received from the rear-facing camera, as shown in user interface 840. The AR gaming experience can monitor progress of the user interacting with the one or more AR elements. In response to determining that a goal has been reached, such as capturing a certain set or number of ghosts or AR elements, the AR gaming application determines that a condition is satisfied. At this time, the AR gaming experience passes parameters to the web-based application indicating the goal that was reached. In response to receiving the parameters, the web-based application user interface 850 is displayed replacing the display of the AR gaming experience. Based on the interactions of the user with the AR gaming experience, the user interface 850 identifies a new virtual game or mode that has become unlocked and available to use as part of the virtual device provided by the web-based application and presents a message informing the user about the new virtual game or mode.

In some examples, an AR experience is presented on a first client device 102. The AR experience can correspond to a capture the flag game. The first client device 102 captures real-time video using a rear-facing camera of one or more real-world buildings in a real-world environment. In response to detecting that a condition associated with a first real-world building has been satisfied, the AR experience renders an AR element, such as a color, animation or pattern over the first real-world building. The AR experience also stores real-world location information, such as GPS coordinates of the first real-world building. The real-world location information is shared with a map application (another component of the client application 104) by the AR experience. The AR experience also shares the visual elements associated with the first real-world building with the map application.

At a later time or concurrently while the AR experience is accessed on the first client device 102, a second client device 102 can access the map application. The map application on the second client device 102 can access the shared information from the AR experience, such as because the first client device 102 authorized sharing of the information with a certain set or group of other client devices 102 including the second client device 102. The map application on the second client device 102 displays a map and receives input from a user that navigates the map to a region that includes the GPS coordinates of the first real-world building. In response, the map application displays a representation of the first real-world building on the map along with a representation of the visual elements associated with the first real-world building generated by the AR experience. For example, the map application displays an indicator or icon with a certain color over the GPS coordinates of the first real-world building on the displayed map region. This allows users who are not involved in the AR experience to track progress of the game and users on the AR experience by looking at a different component, such as a map that is external to the AR experience.

Figure 9:
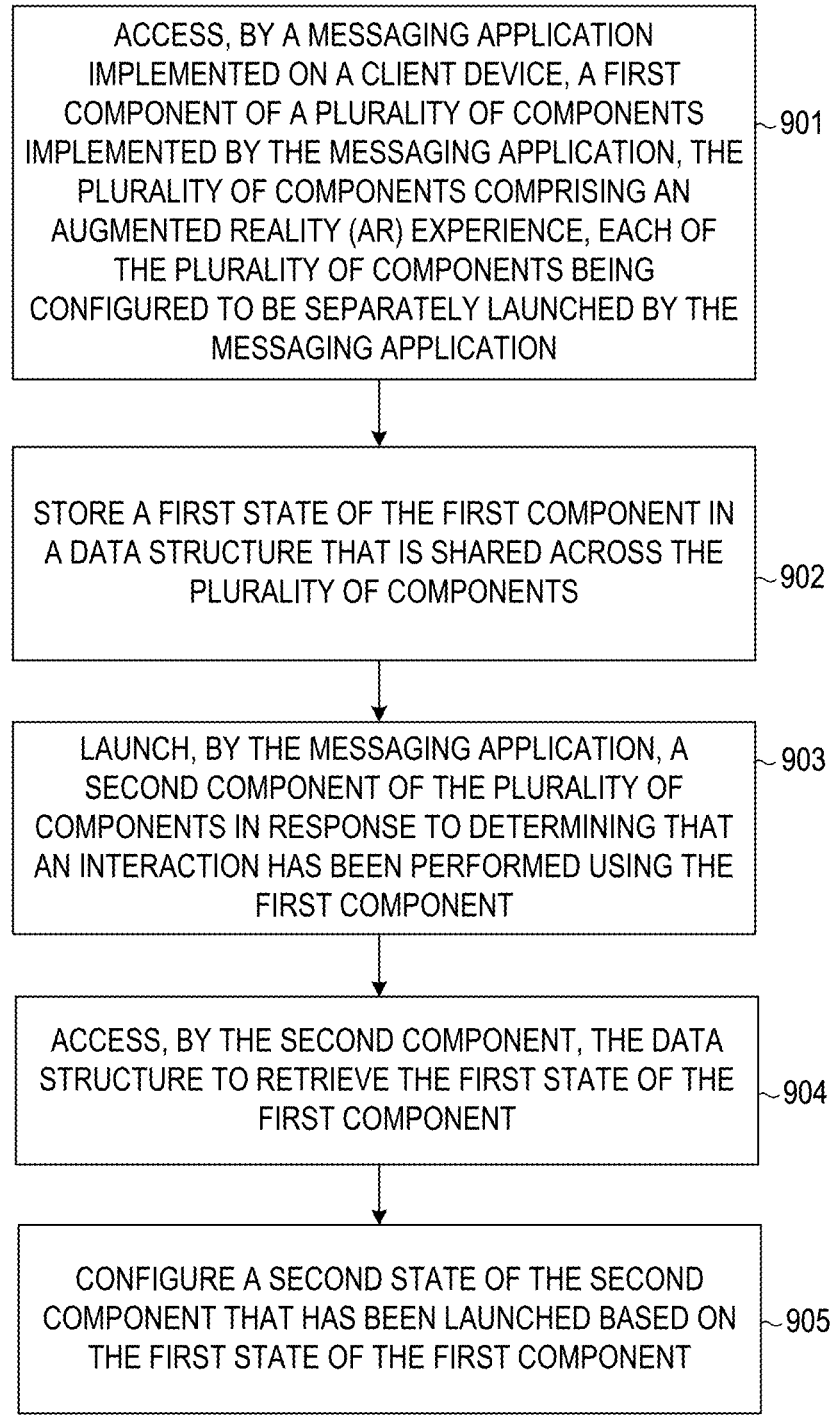
FIG. 9 is a flowchart illustrating example operations of the component integration system, according to some examples.

FIG. 9 is a flowchart of a process 900 performed by the component integration system 224, in accordance with some examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the component integration system 224 (e.g., a client device 102 or a server) accesses, by a messaging application implemented on a client device, a first component of a plurality of components implemented by the messaging application, the plurality of components comprising an augmented reality (AR) experience, each of the plurality of components being configured to be separately launched by the messaging application, as discussed above.

At operation 902, the component integration system 224 stores a first state of the first component in a data structure that is shared across the plurality of components, as discussed above.

At operation 903, the component integration system 224 launches, by the messaging application, a second component of the plurality of components in response to determining that an interaction has been performed using the first component, as discussed above.

At operation 904, the component integration system 224 accesses, by the second component, the data structure to retrieve the first state of the first component, as discussed above.

At operation 905, the component integration system 224 configures a second state of the second component that has been launched based on the first state of the first component, as discussed above.

Machine Architecture

Figure 10:
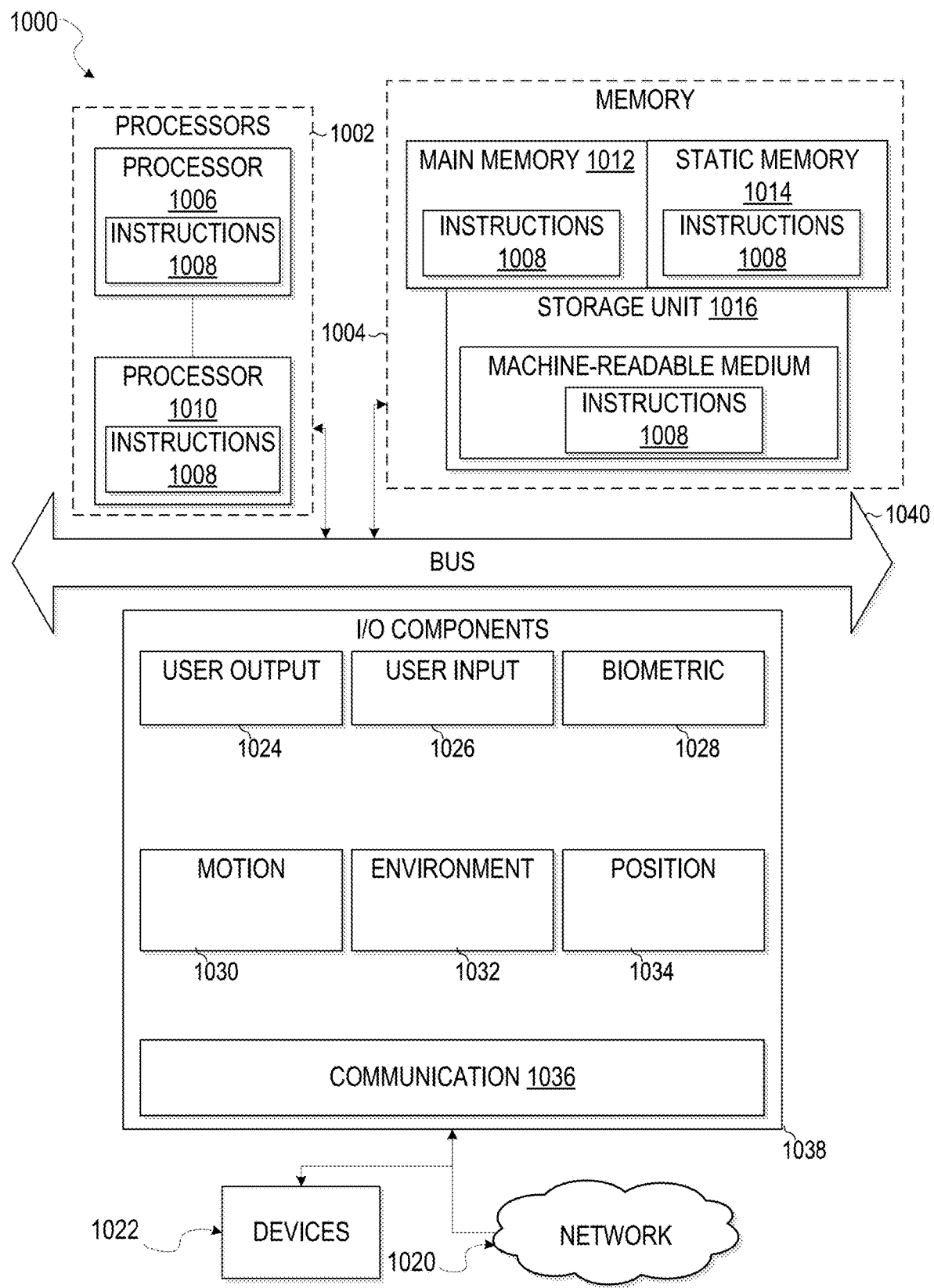
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of a machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1012, the static memory 1014, and the storage unit 1016 store the instructions 1008 embodying any one or more of the methodologies or functions described herein. The instructions 1008 may also reside, completely or partially, within the main memory 1012, within the static memory 1014, within a machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., hypertext transfer protocol (HTTP)). Similarly, the instructions 1008 may be transmitted or received using a transmission medium via a coupling (e.g., a peer-to-peer coupling) to the devices 1022.

Software Architecture

Figure 11:
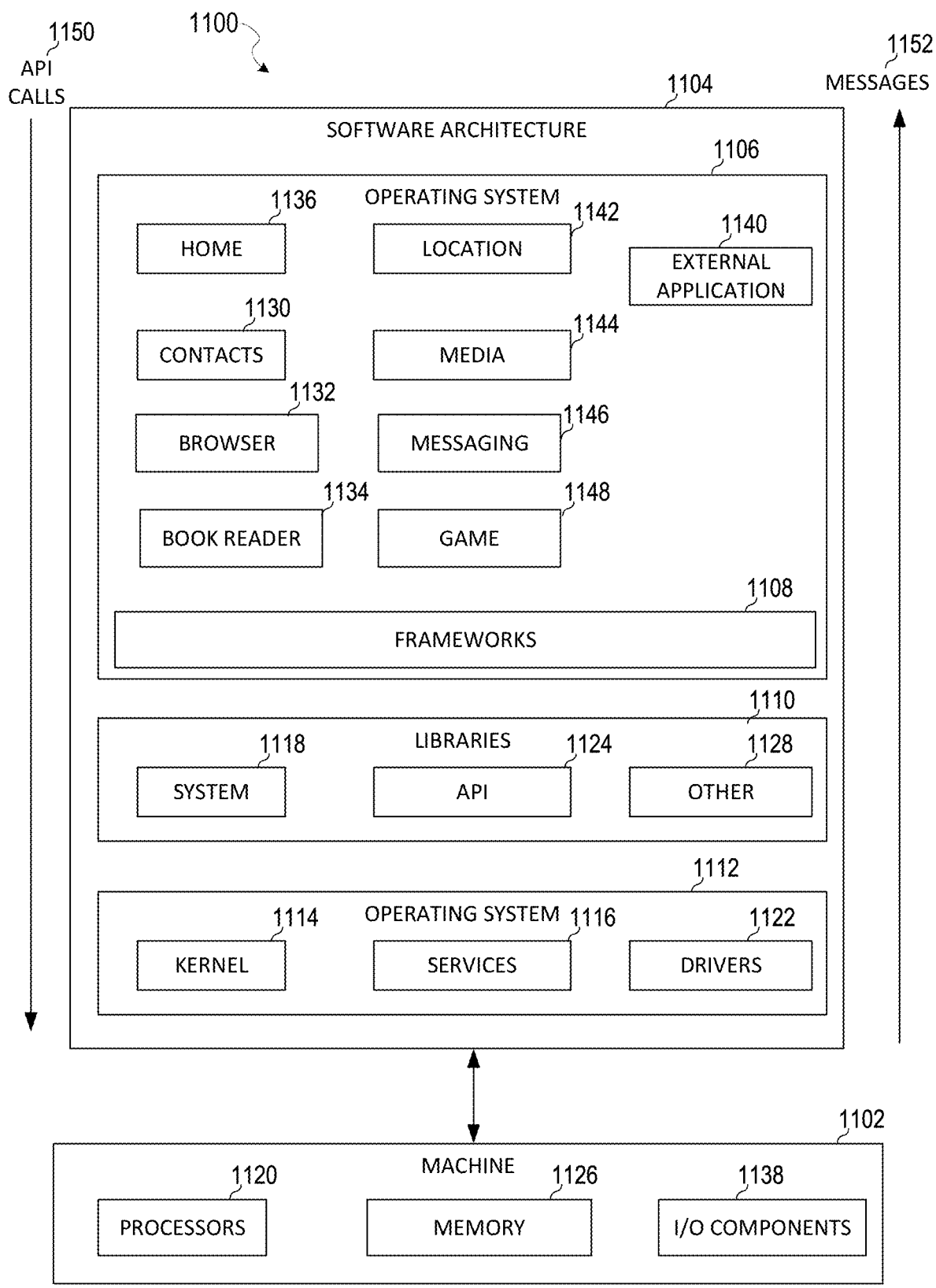
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionality. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 1108 provide a common high-level infrastructure that is used by the applications 1106. For example, the frameworks 1108 provide various graphical user interface (GUI) functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
    accessing, by a device associated with an application developer, an application development platform;
    receiving, via the application development platform, input that defines a set of events associated with an application comprising a first component that controls launching of a second component;
    defining, by the application development platform, a data structure that is shared across a plurality of components comprising the first and second components, the data structure comprising the set of events associated with the first component that control when one or more parameters of the first component are passed to the second component and which of the one or more parameters are passed to the second component; and
    storing the application and the data structure in a library accessible to a user device.

2. The method of claim 1, wherein the application development platform comprises an augmented reality (AR) experience development platform, wherein the application comprises an AR experience, and wherein the second component comprises at least one of a web-based application, a map application, or an avatar application.

3. The method of claim 1, further comprising:
    receiving, from the device as one or more of the set of events, one or more conditions under which the second component is launched.

4. The method of claim 3, wherein the one or more conditions comprise geographical locations, levels in a gaming application or AR experience, accomplishment of one or more goals, views or depictions of real-world environment portions, time, time of day, client device type, user type, user account type, location markers, or image markers.

5. The method of claim 3, wherein the one or more conditions are manually programmed by the application developer.

6. The method of claim 3, wherein the one or more conditions are selected from a list of conditions.

7. The method of claim 1, wherein the set of events comprises combinatorial logic.

8. The method of claim 1, further comprising:
    accessing, by an application implemented on the user device, the first component;
    storing a first state of the first component in the data structure that is shared across the plurality of components;
    launching, by the application, the second component in response to determining that an interaction has been performed using the first component; and
    configuring a second state of the second component based on the interaction that has been performed using the first component.

9. The method of claim 8, further comprising:
    determining that a particular interaction has been performed using the first component comprising at least one of a web-based application, a map application, or an avatar application;

determining that the particular interaction performed using the first component corresponds to a given condition associated with an AR experience; and in response to determining that the particular interaction performed using the first component corresponds to the given condition associated with an AR experience, launching the second component comprising the AR experience.

10. The method of claim 8, wherein determining that the interaction has been performed using the first component comprises:

determining that input has been received from a user corresponding to a specified gesture; and executing, by the first component, a call to action operation associated with the second component to launch the second component.

11. The method of claim 10, further comprising:

in response to determining that the input has been received corresponding to the specified gesture, displaying by the first component a prompt with an option to execute the call to action operation; and receiving a second input that selects the option to execute the call to action operation.

12. The method of claim 10, wherein determining that the interaction has been performed using the first component comprises:

determining that a goal has been reached during use of the first component; and in response to determining that the goal has been reached, automatically executing, by the first component, a call to action operation associated with the second component to launch the second component.

13. The method of claim 1, further comprising:

replacing a display of the first component with a display of the second component in response to launching the second component.

14. The method of claim 13, further comprising:

detecting a specified interaction performed using the second component;

updating the data structure to represent a current state of the second component, and re-accessing the first component based on the updated data structure in response to detecting the specified interaction performed using the second component, wherein the display of the second component is replaced with the display of the first component after the first component is re-accessed.

15. The method of claim 13, further comprising:

detecting a specified interaction performed using the second component, updating the data structure to represent a current state of the second component; and launching, by the second component, a third component of the plurality of components based on the updated data structure in response to detecting the specified interaction performed using the second component, wherein the display of the second component is replaced with a display of the third component after the third component is launched.

16. The method of claim 1, further comprising:

presenting, by the first component, a first AR element comprising a virtual device; and in response to receiving input by the application to unlock the virtual device, causing the second component comprising a web-based application to present a keypad.

17. The method of claim 16, further comprising:

receiving, by the web-based application, a request for a passcode hint; and in response to receiving the request for the passcode hint, causing the application to present one or more elements representing the passcode hint.

18. The method of claim 17, further comprising:

receiving, by the web-based application, interaction with the keypad comprising a correct passcode associated with a passcode hint represented by the application; and enabling, by the web-based application, a user to interact with the virtual device in response to receiving the interaction with the keypad.

19. A system comprising:

at least one processor; and a memory component having instructions stored thereon that, when executed by the at least one processor, cause the at least one processor to perform operations comprising:

accessing, by a device associated with an application developer, an application development platform;

receiving, via the application development platform, input that defines a set of events associated with an application comprising a first component that controls launching of a second component;

defining, by the application development platform, a data structure that is shared across a plurality of components comprising the first and second components, the data structure comprising the set of events associated with the first component that control when one or more parameters of the first component are passed to the second component and which of the one or more parameters are passed to the second component; and storing the application and the data structure in a library accessible to a user device.

20. A non-transitory computer-readable storage medium having stored thereon instructions that, when executed by at least one processor, cause the at least one processor to perform operations comprising:

accessing, by a device associated with an application developer, an application development platform;

receiving, via the application development platform, input that defines a set of events associated with an application comprising a first component that controls launching of a second component;

defining, by the application development platform, a data structure that is shared across a plurality of components comprising the first and second components, the data structure comprising the set of events associated with the first component that control when one or more parameters of the first component are passed to the second component and which of the one or more parameters are passed to the second component; and storing the application and the data structure in a library accessible to a user device.

* * * * *

UNITED STATES PATENT AND TRADEMARK OFFICE
CERTIFICATE OF CORRECTION

| | | |
|---|---|---|
| PATENT NO. | : 12,387,444 B2 | Page 1 of 1 |
| APPLICATION NO. | : 18/665388 | |
| DATED | : August 12, 2025 | |
| INVENTOR(S) | : Boroujerdi et al. | |

It is certified that error appears in the above-identified patent and that said Letters Patent is hereby corrected as shown below:

In the Claims

In Column 39, Line 42, in Claim 14, delete "component," and insert --component;-- therefor In Column 39, Line 52, in Claim 15, delete "component," and insert --component;-- therefor Signed and Sealed this
Tenth Day of February, 2026

John A. Squires
*Director of the United States Patent and Trademark Office*